(12) United States Patent
Dasam

(10) Patent No.: US 10,599,652 B2
(45) Date of Patent: Mar. 24, 2020

(54) DATABASE QUERY TIME ESTIMATOR

(71) Applicant: Dell Products L. P., Round Rock, TX (US)

(72) Inventor: Lokesh Dasam, Khammam (IN)

(73) Assignee: Dell Products, L.P., Round Rock, TX (US)

( * ) Notice: Subject to any disclaimer, the term of this patent is extended or adjusted under 35 U.S.C. 154(b) by 260 days.

(21) Appl. No.: 15/596,203

(22) Filed: May 16, 2017

(65) Prior Publication Data

US 2018/0336246 A1 Nov. 22, 2018

(51) Int. Cl.
G06F 16/2453 (2019.01)
(52) U.S. Cl.
CPC .... *G06F 16/24545* (2019.01); *G06F 16/2453* (2019.01)
(58) Field of Classification Search
CPC combination set(s) only.
See application file for complete search history.

(56) References Cited

U.S. PATENT DOCUMENTS

| | | | | |
|---|---|---|---|---|
| 2003/0055813 | A1* | 3/2003 | Chaudhuri | G06F 16/24545 |
| 2008/0091669 | A1* | 4/2008 | Anderson | G06F 16/211 |
| 2014/0095474 | A1* | 4/2014 | Chakkappen | G06F 16/24542 |
| | | | | 707/718 |
| 2016/0171070 | A1* | 6/2016 | Hrle | G06F 16/273 |
| | | | | 707/615 |

* cited by examiner

*Primary Examiner* — Shyue Jiunn Hwa
(74) *Attorney, Agent, or Firm* — Shiv S. Naimpally; Campbell Stephenson LLP

(57) ABSTRACT

A Database Query Time Estimator (DQTE) module as a run-time tool to estimate and display the total time to complete a database query while the query is executing. The DQTE module invokes a runtime algorithm to compute the set of rows or blocks in a database that will be resulted at each step of a query's execution plan. The DQTE module may optimize the current execution plan to create one or more parent-child processes and may assign tasks to these processes to monitor the progress of each step in the execution plan. The progress of the child processes is then rolled up to the root parent level to come up with a time value, which is the Estimated Time of Arrival (ETA) to complete the whole execution of the query. The DQTE module may read only the header information of the database objects for a complete snapshot of the object.

20 Claims, 10 Drawing Sheets

Structure of Leaf Block in Bitmap Index

Structure of Branch Block in Bitmap Index

DATABASE QUERY TIME ESTIMATOR

TECHNICAL FIELD

This disclosure relates generally to database management and, more particularly, to a run-time database development tool that allows estimation of the total time to complete a database query while the query is executing.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

In modern databases, a vast amount of digital content is stored using a relational model of data organization. Various software systems used to maintain or manage such relational databases are known as a Relational Database Management System (RDBMS). Thus, an RDBMS (or, more simply, a DBMS) is a software tool for database development, administration, and management. Virtually all modern relational database systems use Structured Query Language (SQL) as the language for querying and maintaining the database (DB). Some examples of an RDBMS include an Oracle® server, a Microsoft® SQL server, a MySQL (open source) system, an IBM® DB2 system, and so on. In the discussion herein, the terms "RDBMS", "DBMS," "database management system," "database manager," "SQL server", and other terms of similar import may be used interchangeably to refer to a relational database management tool.

When an RDBMS (or SQL server) gets a query to execute, it performs two major steps to execute the query and return the output. The first step is query compilation, which generates a query execution plan. The second step is execution of the query execution plan to generate the final output. In the SQL server, the received query is parsed and then processed by a query optimizer, which generates an execution plan. The optimizer attempts to determine the most efficient way to execute a given query. Once the query execution plan is ready and available to execute, SQL server storage engines may execute the plan using database accesses and return the desired output to the user as a result of query execution.

FIG. 1 shows an exemplary prior art execution plan 10 from an Oracle® system. The execution plan 10 is generated for the following query, which is also listed in FIG. 1 on top of the execution plan 10 and identified using the reference numeral "12":

select*from hr. employees e, hr.departments d where e.department_id=d.department_id;

The example in FIG. 1 depicts the execution plan 10 for the query 12 with two table (the "hr.employees" table and the "hr.departments" table) joins. In this example, the Oracle® system was estimating that a total of 106 records/rows would be processed for the final result, as pointed out by the reference numeral "14". The system was also showing that a total of 2173 rows were processed so far, as pointed out by the reference numeral "16." It is noticed from the execution plan 10 that the number of estimated rows—106 rows—is different from the number of the actual records processed so far—2173 rows. The number of processed rows was with reference to a given point of time in the query execution—here, the plan 10 shows that 2173 records were processed during 0.13 seconds into query execution. In FIG. 1, the plan entry for the elapsed time is identified using the reference numeral "18."

SUMMARY

This Summary provides a simplified form of concepts that are further described below in the Detailed Description. This Summary is not intended to identify key or essential features and should therefore not be used for determining or limiting the scope of the claimed subject matter.

It is seen from FIG. 1 that details of query execution estimation by a currently-available Oracle system are inaccurate. For example, as noted above, the number of estimated rows are different from the number of actual records processed so far. Furthermore, although the system informs the user about the rows processed so far at any given point in time, the system is unable to provide any information about how many incoming rows are pending to be processed, thus lacking the capacity to estimate the query completion time or the Estimated Time of Arrival (ETA) to complete the query.

Modern database software like Oracle®, Microsoft® SQL server, and the like, are typically able to show only progress of only a Full Object access such as a Full Table Scan or a Full Index Scan. Because of the full object access, the database management software is able to read and understand the number of data segments/blocks in the database occupied by the whole object. As a result, the database software may be able to count on the progress of a query. However, the software is not able to identify the progress accomplished in other types of database accesses such as, for example, Index Range Scans, Index Skip Scans, Index Partition Scans, Hash Joins, Nested Loops, Merge Joins, Sorting, SET Operations, Aggregate Functions, DISTINCT Operations, Bitmap Access, Bitmap Logical Operations, Hierarchical Query Access, and so on.

Thus, today's database development tools, such as the RDBMSs, have very limited capability to show the progress of a query executing in the database. These tools can show only the rows processed so far, but not the total number of rows that will be processed at each step of the execution plan. As a result, these tools lack the ability to show what percentage of the query is completed and what percentage is left over, as well as ETA to complete the whole query.

It is therefore desirable to devise a database management or development tool that can estimate the total time to complete a database query while the query is executing. It is also desirable that this run-time tool be able to calculate the ETA to complete the query.

The present disclosure relates to a Database Query Time Estimator (DQTE) module that invokes a runtime algorithm to compute the set of rows or data blocks in a database that will be resulted at each step of a query's execution tree/plan. Based on this computation, the DQTE module can facilitate estimation of the ETA or the total time to complete the query. This estimation is made available while the query is executing. Some of the examples herein use commands for a particular vendor's database (e.g., Oracle®). However, comparable commands may be used for other vendor databases.

In particular embodiments, the DQTE module (or, more simply, "the Estimator") may optimize the current execution plan of a query and create one or more parent-child processes. The Estimator may then assign tasks to these processes to monitor the progress of each step in the execution plan/tree and roll up the progress of the child processes to the root parent level to come up with a time value, which is the ETA to complete the whole execution of the query. Computing the query execution time using the internal algorithms of an existing database software or RDBMS is a tedious process. Therefore, to shorten the computation, the DQTE module may read only the header information of the blocks of the database objects. The block headers may provide the necessary information about the data residing inside the corresponding blocks of object to enable the Estimator or the Operating System (OS) to determine the progress of query execution.

In one embodiment, the present disclosure is directed to a method to estimate completion time of a database query while the query is being executed. The method comprises performing the following using a computing system: (a) obtaining an execution plan for the query received on a database associated with the computing system; (b) based on the execution plan, identifying each source object to be accessed in the database to completely execute the query; (c) based on each identified source object, determining a query-specific first number of data rows or blocks in the database pending to be processed for query execution and a query-specific second number of data rows or blocks in the database already processed for query execution; and (d) estimating the completion time of the query using the query-specific first number, the query-specific second number, and a time value for time elapsed to process the query-specific second number of data rows or blocks.

In another embodiment, the present disclosure is directed to a computing system to estimate completion time of a database query while the query is being executed. The computing system comprises: (a) a memory storing program instructions; and (b) a processing unit coupled to the memory and operable to execute the program instructions. The program instructions, when executed by the processing unit, cause the computing system to perform the following: (i) obtain an execution plan for the query received on a database associated with the computing system; (ii) based on the execution plan, identify each source object to be accessed in the database to completely execute the query; (iii) based on each identified source object, determine a query-specific first number of data rows or blocks in the database pending to be processed for query execution and a query-specific second number of data rows or blocks in the database already processed for query execution; and (iv) estimate the completion time of the query using the query-specific first number, the query-specific second number, and a time value for time elapsed to process the query-specific second number of data rows or blocks.

In a further embodiment, the present disclosure is directed to a computer program product comprising a non-transitory computer-usable medium having computer-readable program code embodied therein, the computer-readable program code adapted to be executed by a computing system to implement a method. The method comprises: (a) obtaining an execution plan for a query received on a database associated with the computing system; (b) based on the execution plan, identifying each source object to be accessed in the database to completely execute the query; (c) based on each identified source object, determining a query-specific first number of data rows or blocks in the database pending to be processed for query execution and a query-specific second number of data rows or blocks in the database already processed for query execution; and (d) while the query is being executed, estimating the completion time of the query using the query-specific first number, the query-specific second number, and a time value for time elapsed to process the query-specific second number of data rows or blocks.

The DQTE module, when enabled at run-time, may deeply access relevant operations in the internal algorithm structures of a database or RDBMS and manipulate the source of data so that information about the number of rows to be processed at each level of a query's execution plan/tree may be obtained. As a result, the ETA to complete the whole execution (of the query) can be computed as well.

BRIEF DESCRIPTION OF THE DRAWINGS

A more complete understanding of the present disclosure may be obtained by reference to the following Detailed Description when taken in conjunction with the accompanying Drawings. For ease of discussion, the same reference numbers in different figures indicate similar or identical items.

DETAILED DESCRIPTION

For purposes of this disclosure, an information handling system (e.g., a computing device) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or video display. The information handling system may also include one or more buses operable to transmit communications between the various hardware components.

It is noted here that, for ease of discussion, a computer software, program code or module may be referred to as "performing," "accomplishing," or "carrying out" a function or process. However, it is evident to one skilled in the art that such performance may be technically accomplished by a processor when the software or program code is executed by the processor. The program execution would cause the processor to perform the tasks or steps instructed by the software to accomplish the desired functionality or result. However, for the sake of convenience, in the discussion below, a processor or software component may be referred to interchangeably as an "actor" performing the task or action described, without technically dissecting the underlying software execution mechanism. Furthermore, a hyphenated term (e.g., "query-specific", "computer-readable", etc.) may be occasionally interchangeably used with its non-hyphenated version (e.g., "query specific," "computer readable", etc.), and a capitalized entry (e.g., "Operating System", "Bitmap", "Sort", "Join", "GV$SQL_PLAN_MONITOR", etc.) may be interchangeably used with its non-capitalized version (e.g., "operating system," "bitmap", "sort", "join", "GV$Sql_Plan_Monitor", etc.), especially in the context of database/SQL commands, tasks, and operations. Such occasional interchangeable uses shall not be considered inconsistent with each other.

Figure 2:
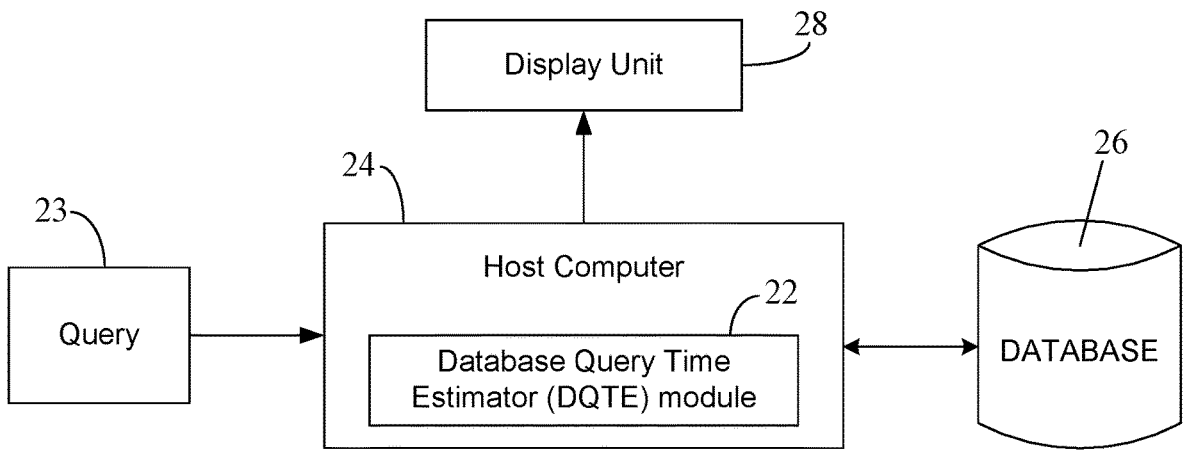
FIG. 2 depicts an exemplary arrangement to estimate query execution time using a DQTE module as per particular embodiments of the present disclosure.
Figure 11:
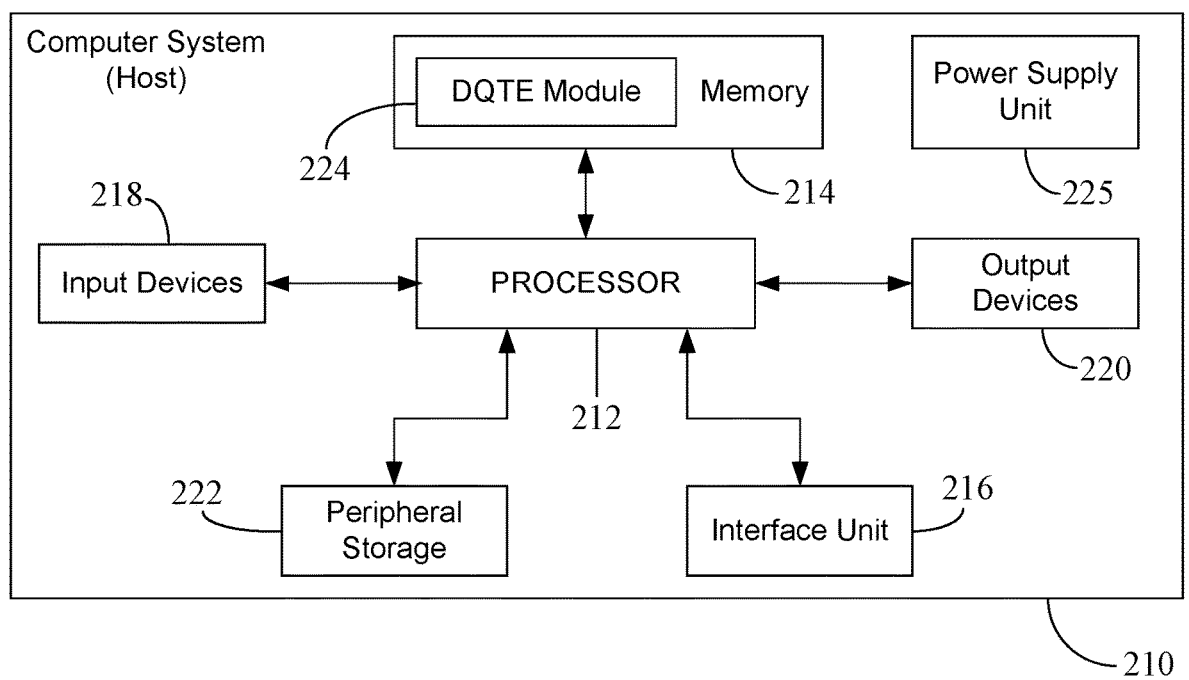
FIG. 11 illustrates an example configuration of a computing device that can be used to implement the systems and techniques described herein.

FIG. 2 depicts an exemplary arrangement 20 to estimate query execution time using a DQTE module (or Estimator) 22 as per particular embodiments of the present disclosure. As discussed in more detail below, the DQTE module 22 may enable advance estimation of the ETA to completely execute a query 23. As shown, the DQTE module 22 may reside in a host computer 24, which may be an information handling system (discussed below). The program code constituting the DQTE module (or the Estimator) 22 may be stored in a storage unit or memory in the host computer 24 and executed by a processor in the host computer 24. Such memory, processor, and other exemplary architectural details of the host computer 24 are shown in FIG. 11 and discussed later below. The host computer 24 may interact with a database 26 to execute the query 23 and, with the help of the Estimator 22, also may display the query's ETA on a display unit 28 associated with the host system 24. In particular embodiments, the database 26 may be managed by a database-specific management system or RDBMS (not shown) with which the Estimator 22 may interact to facilitate computation of the ETA for the query 23. The program code for the RDBMS may be stored in the database itself or in a memory unit (not shown) in the host system 24. As before, the RDBMS may be an Oracle® server, a Microsoft® SQL server, a MySQL (open source) system, an IBM® DB2 system, and so on. Although the database 26 is shown as a separate unit in FIG. 2, it is understood that, in particular embodiments, the database 26 may be a part of the data storage or memory unit of the host computer 24 as discussed later with reference to the embodiment in FIG. 11.

The internal physical storage or architectural configuration of the database 26 is not relevant to the present disclosure and, hence, no additional details thereof are provided here. Furthermore, it is observed that the query 23 may be either generated at the host system 24—such as, for example, during testing or administration of the database 26—or received at the host 24 from an external source (not shown) like a client computer system, a web server, and the like. Although the discussion here uses examples of SQL-based queries 23, it is understood that the teachings of the present disclosure remain applicable to non-SQL queries as well.

For purpose of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. As discussed later in more detail with reference to FIG. 11, an information handling system as per particular embodiments of the present disclosure may include Random Access Memory (RAM), one or more processing resources such as a central processing unit (CPU) or hardware or software control logic, Read-Only Memory (ROM), and/or other types of volatile/non-volatile memory. Additional components of the information handling system may include one or more disk drives, one or more network ports for communicating with external devices as well as various input and output (I/O) devices, such as a keyboard, a mouse, a touchscreen and/or video display. The information handling system may also include one or more buses operable to transmit communications between the various hardware components.

Figure 1:
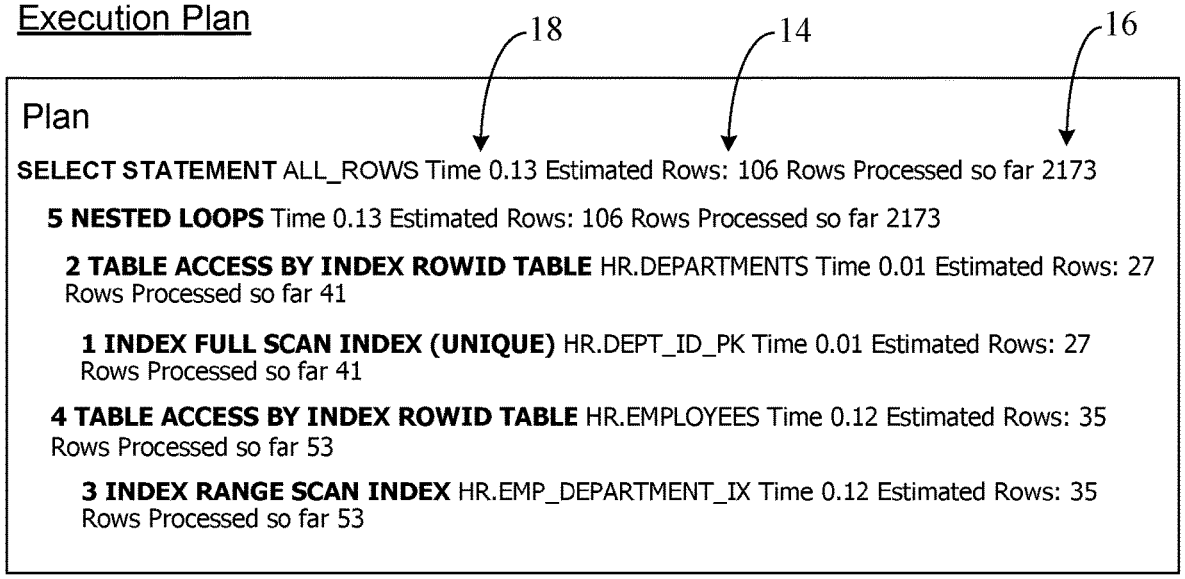
FIG. 1 shows an exemplary prior art execution plan from an Oracle® system.

A query execution plan—such as the plan 10 in FIG. 1—may have many steps to be processed to accomplish query execution. A database management system may process these steps. However, in the context of the DQTE module 22, the parent-child processes may be different from those decided by the database management system in the execution plan. In particular embodiments, the nature of data reading mechanism—such as, for example, if the data object under consideration is a Binary Tree (B-tree), a bitmap, a hash object, a nested object, and so on—may drive the DQTE module 22 to divide and allocate various parent/child processes. However, in the DQTE module 22 in some embodiments, a parent process in the DBMS's execution plan will not become a child process or vice versa.

An example is now provided to illustrate how ETA to complete a query may be computed. In this example, it is assumed that an Object A is to be joined with an Object B. These objects are given below and the join operation is represented below as "A μ B". It is observed that the joining may be accomplished by reading all the values in the Object A sequentially and matching with the values in the Object B. The following iterations illustrate the steps needed to complete this join operation.

Object $A \equiv \{1, 2, 3, 4, 5, 6, 7, 4, 2, 1,$ $5, 4, 3, 2, 1, 0, 3, 2, 1, 5, 6, 7, 8, 9, 1, 2, 4, 6, 3\}$ Object $B \equiv \{9, 6, 2, 4, 0, 1, 3, 6\}$ $A \mu B \equiv \{1, 9\} \{1, 6\} \{1, 2\} \{1, 4\} \{1, 4\} \{1, 0\} \{1, 1\} \{1, 3\} \{1, 6\} \rightarrow$ Iteration 1 0:05

$\{2, 9\} \{2, 6\} \{2, 2\} \{2, 4\} \{2, 4\} \{2, 0\} \{2, 1\} \{2, 3\} \{2, 6\} \rightarrow$ Iteration 2 0:10

$\{3, 9\} \{3, 6\} \{3, 2\} \{3, 4\} \{3, 4\} \{3, 0\} \{3, 1\} \{3, 3\} \{3, 6\} \rightarrow$ Iteration 3 0.15

$\{4, 9\} \{4, 6\} \{4, 2\} \{4, 4\} \{4, 4\} \{4, 0\} \{4, 1\} \{4, 3\} \{4, 6\} \rightarrow$ Iteration 4 ?

$\{5, 9\} \{5, 6\} \{5, 2\} \{5, 4\} \{5, 4\} \{5, 0\} \{5, 1\} \{5, 3\} \{5, 6\} \rightarrow$ Iteration 5 ?

$\{6, 9\} \{6, 6\} \{6, 2\} \{6, 4\} \{6, 4\} \{6, 0\} \{6, 1\} \{6, 3\} \{6, 6\} \rightarrow$ Iteration 6 ?

...

$\{3, 9\} \{3, 6\} \{3, 2\} \{3, 4\} \{3, 4\} \{3, 0\} \{3, 1\} \{3, 3\} \{3, 6\} \rightarrow$ Iteration 29 ?

In the above example, it is assumed that the ETA computations are performed after two iterations are already completed. The operations at the first iteration (Iteration 1) were completed in five seconds (the "0:05" time entry above) and the operations at the second iteration (Iteration 2) were completed in another five seconds (as represented by the "0:10" time entry at Iteration 2 giving the total processing time of ten seconds). As discussed in more detail later, a DQTE module—such as the DQTE module 22 in FIG. 2—may have the intelligence to know the total number of values to be scanned in Object A to enable calculation of the arrival time (ETA) to complete the join process of Objects A and B as given by the equations below.

ETA=(Total number of iterations*Time taken so far to complete the iterations so far)/(Iterations completed so far)   Equation-1

Average Rate of Processing(RP)=(Current iteration−Past iteration)/(Current iteration time−Past iteration time taken)   Equation-2

From the above equations, the following values may be obtained for ETA and RP for the join operation on Objects A and B.

ETA($A\mu B$)=(29 iterations*10 seconds)/ (2 iterations)=145 seconds

RP($A\mu B$)=(3−2)/(15−10)=0.2=1 iteration/5 seconds

It is noted here that, in some embodiments, the ETA calculation may be performed by the DQTE module 22 itself. In other embodiments, the DQTE module 22 may provide the necessary inputs—such as for example, the total number of rows/blocks already processed, the total number of rows/blocks pending to be processed, and the elapsed time so far—to another program such as, for example, the Operating System (OS) for the host computer 24, to enable the program to compute the ETA and the RP values for the query under execution.

Figure 3:
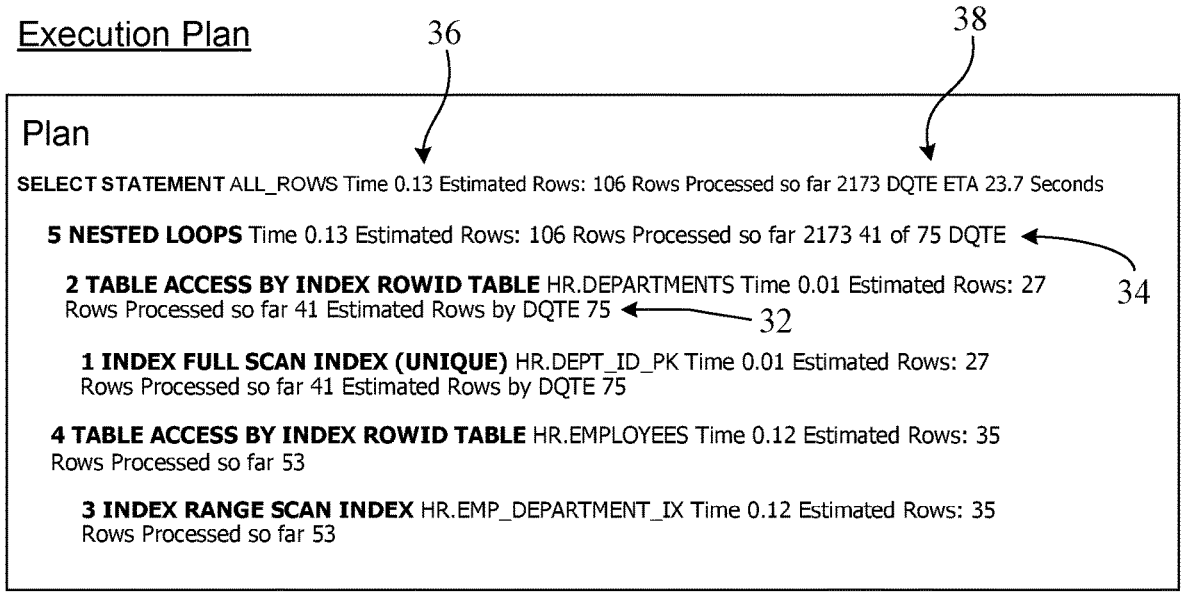
FIG. 3 is an exemplary execution plan that is a modified version of the execution plan in FIG. 1 obtained using a DQTE module as per some embodiments of the present disclosure.

FIG. 3 is an exemplary execution plan 30 that is a modified version of the execution plan 10 in FIG. 1 obtained using a DQTE module as per some embodiments of the present disclosure. For example, such a DQTE module may be the DQTE module 22 of FIG. 2. In the embodiment of FIG. 3, the same query 12 as in case of FIG. 1 is executed, but with DQTE enabled. Thus, it is seen from the arrow with reference numeral "32" in the execution plan 30 that the DQTE module was able to estimate that a total of 75 records/rows were pending to be processed. Furthermore, the DQTE module was also able to indicate that 41 of those 75 records had been processed so far at steps 1 and 2 in the nested loop operation, as highlighted by the arrow with reference numeral "34". It has been thirteen seconds (0.13) into query execution so far, as pointed out by the arrow with reference numeral "36." Based on these values and equation-1 above, the ETA to complete the query was estimated to be 23.7 seconds ((total of 75 records*13 seconds)/(41 records processed so far)=23.7 seconds) as illustrated by the arrow with reference numeral "38." As mentioned before and as can be seen from the execution plan 30, various numbers of records/rows calculated or estimated by the DQTE module may be different from those estimated by the database management system (here, the Oracle® system). However, such differences do not impact the query's execution or modify the DBMS-specified execution plan for the query 12.

Thus, with DQTE, accurate and useful information may be obtained about the total number of rows to be processed and outstanding to be processed to complete a query's execution as per the RDBMS-generated execution plan for the query. This can help database developers and business users to monitor the progress of a query's execution and modify or "fine-tune" the query, if needed, to comply with a Service Level Agreement (SLA) or other software design parameters specifying certain time-wise restrictions on a query's execution.

Figure 4:
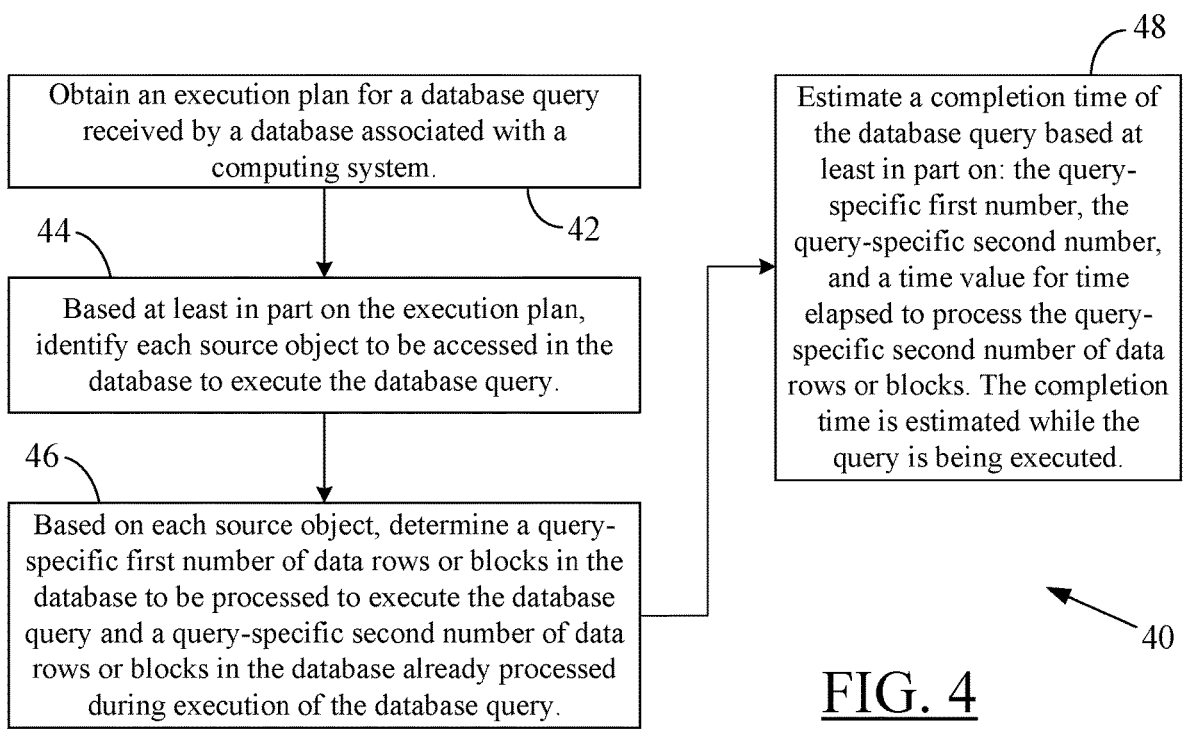
FIG. 4 is an exemplary flowchart depicting various steps that may be performed by a DQTE-enabled computer system as per particular embodiments of the present disclosure to estimate the completion time of a database query.

FIG. 4 is an exemplary flowchart 40 depicting various steps that may be performed by a DQTE-enabled computer system, such as the host system 24 in FIG. 2, as per particular embodiments of the present disclosure to estimate the completion time of a database query. In one embodiment, the program code for the DQTE module 22 (and other relevant program code) may be executed by a processor (not shown) in the host computing system 24 and, upon execution of the program code, the host system 24 may be operative to perform the tasks illustrated in FIG. 4. Initially, at task 42, the host system 24 may obtain an execution plan for a database query received by a database—such as the database 26 in FIG. 2—associated with the host computing system 24. Based at least in part on the execution plan, the computing system 24 may identify each source object to be accessed in the database 26 to execute the database query (task 44). Based on each source object, the computing system 24 may determine the following two items at task 46: (i) a query-specific first number of data rows or blocks in the database 26 to be processed to execute the database query, and (ii) a query-specific second number of data rows or blocks in the database 26 already processed during execution of the database query. Thereafter, at task 48, the computing system 24 may estimate a completion time (or ETA) of the database query based at least in part on: the query-specific first and second numbers determined at task 46 along with a time value for the time elapsed to process the query-specific second number. Like the example illustrated in FIG. 3, it is noted here that the query completion time (or ETA) is estimated at task 48 while the query is being executed.

Figure 5:
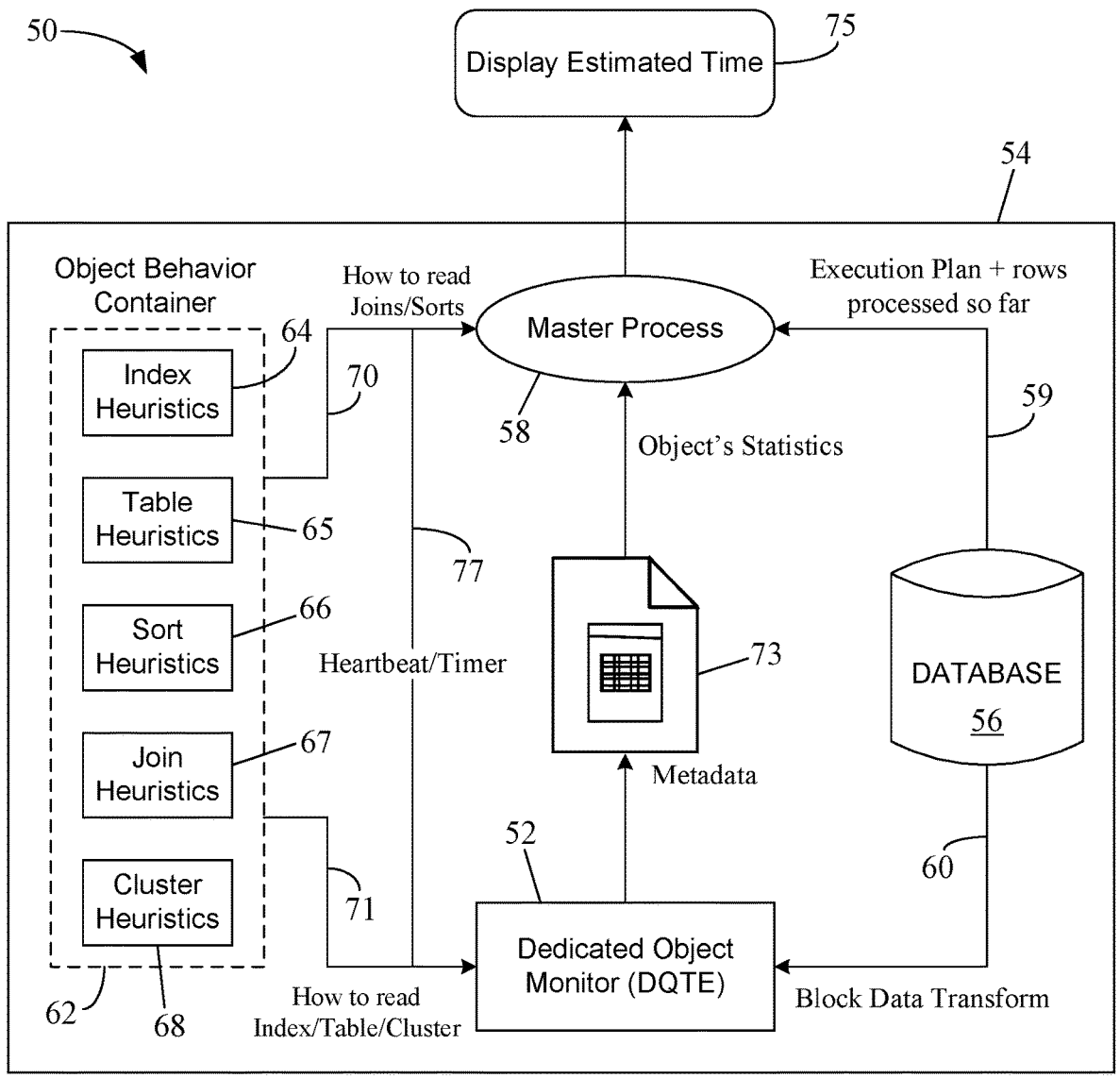
FIG. 5 is an exemplary hosting diagram illustrating operational aspects of query execution in the presence of a DQTE module as per particular embodiments of the present disclosure.

FIG. 5 is an exemplary hosting diagram 50 illustrating operational aspects of query execution in the presence of a DQTE module 52 as per particular embodiments of the present disclosure. In the hosting diagram 50, a system 54 is shown to include the DQTE module 52 interacting with a database 56 and a master process 58. It is noted that the illustration in FIG. 5 shows certain operational details related to query execution only; it does not provide a detailed illustration of the hardware and software architecture for the system 54. Thus, for example, the task 52 may represent a run-time instance of a dedicated object monitor (the DQTE software) and the oval 58 may represent a run-time instance of a master process, such as, for example, an Operating System (OS), associated with the query execution task at hand. In one embodiment, the system 54 may be a computing unit such as, for example, the host computer 24 shown in FIG. 2. In that case, the DQTE module 52 may be functionally similar to the DQTE module 22 and the database 56 may represent the database 26 in FIG. 2. The database 56 may be managed by a database manager or RDBMS (not shown), which may interact with the DQTE module 52 and the master process 58. As part of that interaction, the master process 58 may obtain from the database manager the query's execution plan and the total number of rows processed so far, as indicated by arrow 59 in FIG. 5. On the other hand, as discussed in more detail later below, the DQTE module 52 may obtain the header content of various data blocks from the database manager, as indicated by arrow 60 in FIG. 5. In certain embodiments, the content may be originally in RAW data and/or HEX data format, and the OS 58 may transform it into a data format that is understandable by the DQTE module 52.

An object behavior container 62 may be stored in a memory (not shown) of the computer system 54 or may be a part of the content storage associated with the database manager. In one embodiment, the container 62 may contain heuristics on various types of objects such as, for example, index objects (box 64), table objects (box 65), sort objects (box 66), join objects (box 67), and cluster objects (box 68). Other types of objects that may be included in the object behavior container 62 include, for example, a B-tree, a bitmap, a reverse B-tree, a function B-tree, a function bitmap, a hash object, a nested object, a merge object, a minus object, an intersect object, a union object, a distinct object, a cross, a rank, a union-all object, a hash group, a bubble object, an insertion sort, a merge sort, a statistical function, an analytics object, an in-memory temporary object, and a cube.

In the context of FIG. 5, it is observed that, during query execution, the OS 58 may obtain from the container 62 information about how to read objects like joins and sorts (as indicated by arrow 70) whereas the DQTE module 52 may obtain information about how to read index, table, and cluster objects (as indicated by arrow 71). Based on the received information at arrow 71 and the block data content at arrow 60, the DQTE module 52 may generate metadata 73 about each object containing statistics about the object involved in the execution of the query and submit the statistics to the master process 58. In some embodiments, the object-specific metadata 73 can be kept in JavaScript Object Notation (JSON), in an Elastic database, or in database table(s). The object metadata may provide the master process 58 with information about the total number of object-specific rows/blocks/records that need to be processed (or pending/outstanding to be processed) as part of the execution of the query. Using such information for each object associated with query execution along with the information on rows processed so far (arrow 54) and the time elapsed so far into the query execution, the master process 58 may compute the ETA to complete the query using the approach mentioned earlier with reference to discussion of Equations 1-2 and FIG. 3. The computed ETA may be displayed on a display terminal (not shown), as indicated by task 75. In some embodiments, the master process 58 and the DQTE module 52 may be "linked" with a timer or heartbeat mechanism—which is represented using the reference numeral "77" in FIG. 5—to synchronize the timing information between them to enable the master process 58 to have a correct value of the elapsed time while computing the ETA for the query.

Figure 6:
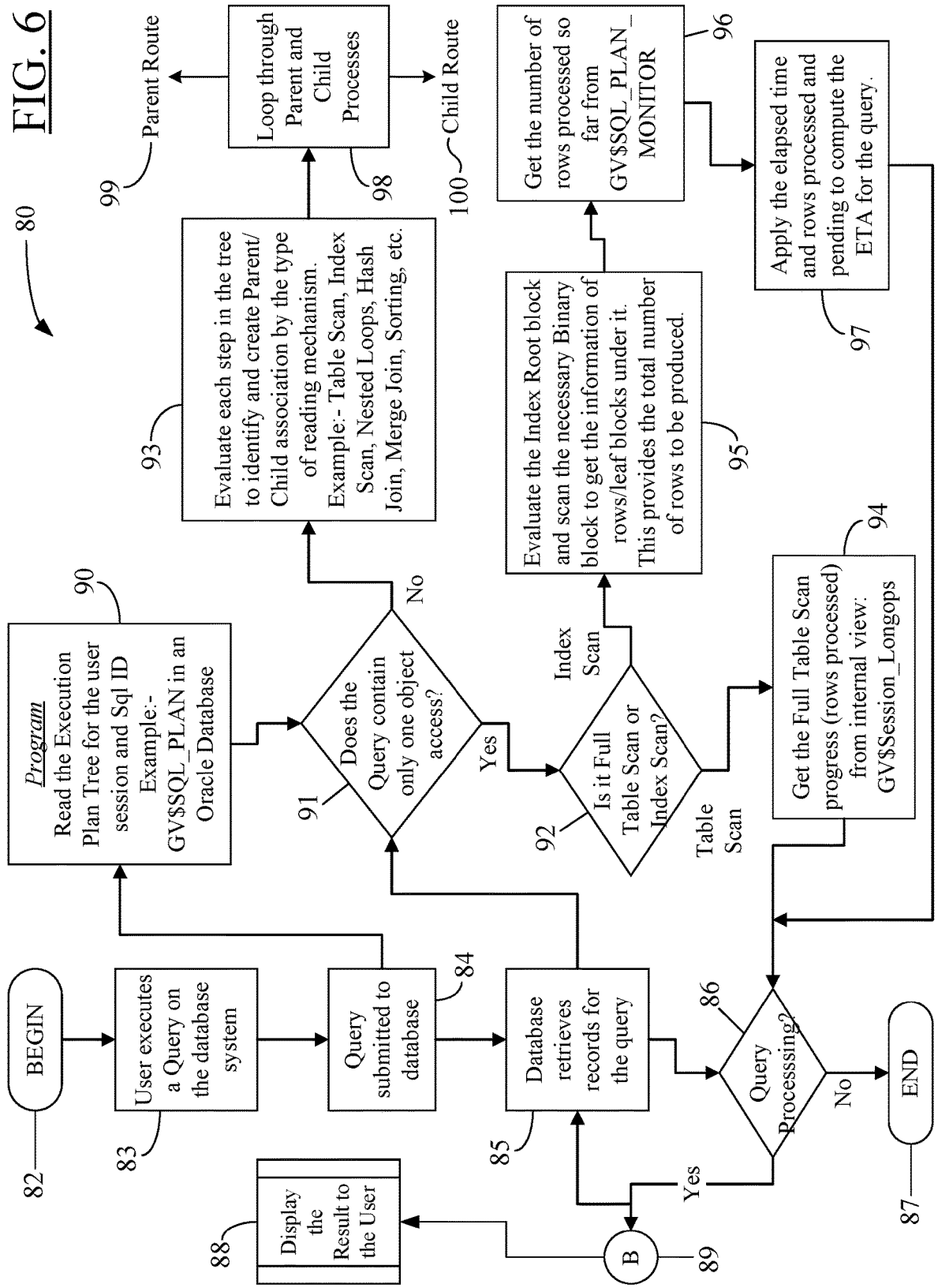
FIG. 6 is an exemplary flowchart providing a detailed overview of various processing aspects associated with computation of a query-specific ETA using a DQTE module as per particular embodiments of the present disclosure.
Figure 6:
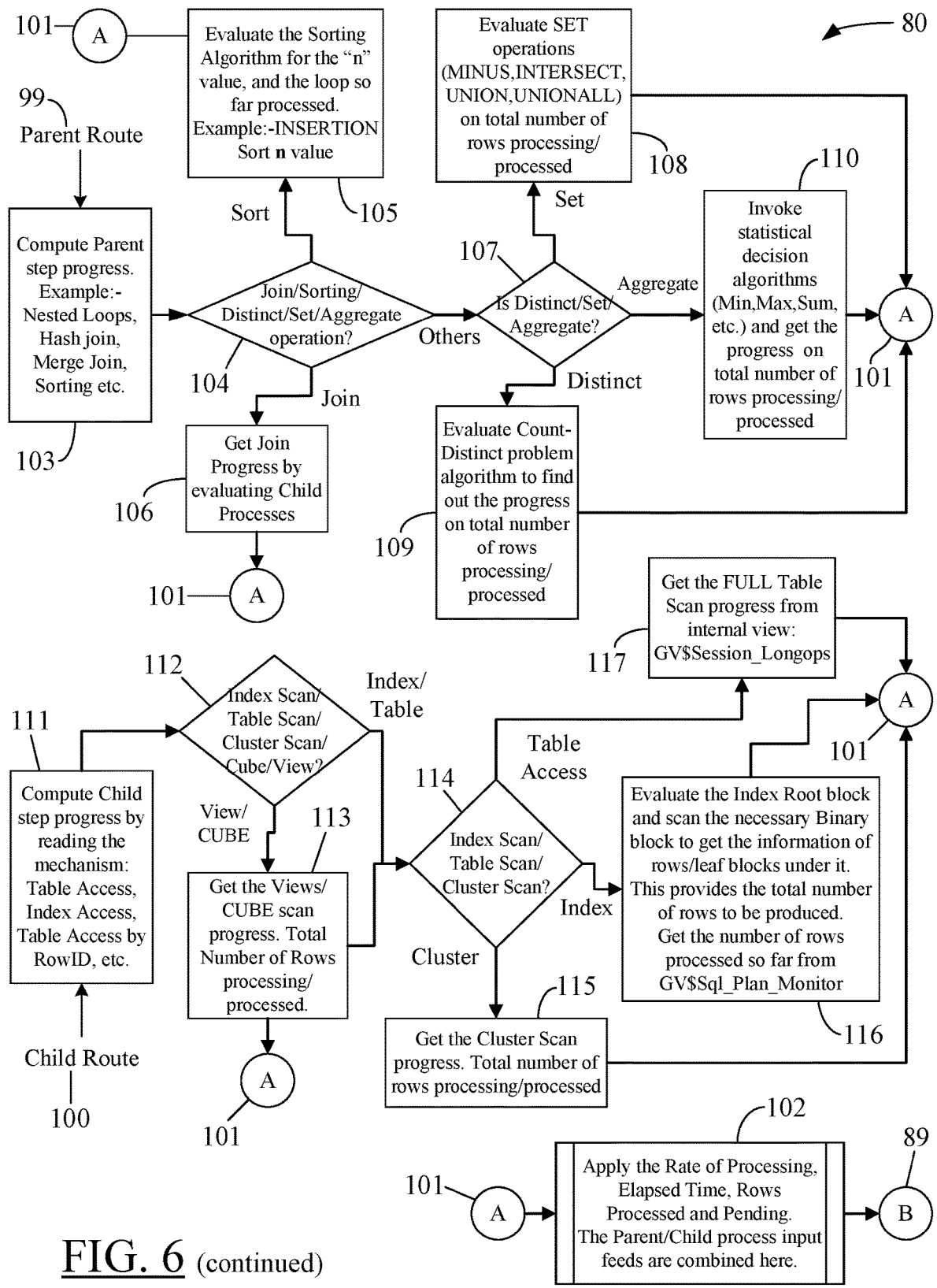

FIG. 6 is an exemplary flowchart 80 providing a detailed overview of various processing aspects associated with computation of a query-specific ETA using a DQTE module—such as the DQTE module 22 in FIG. 2—as per particular embodiments of the present disclosure. As noted before, in one embodiment, the program code for the DQTE module 22 (and other relevant program code) may be executed by a processor (not shown) in the host computing system 24 and, upon execution of the program code, the host system 24 may be operative to perform the tasks illustrated in FIG. 6. Various SQL examples and operations discussed here with reference to FIG. 6 are given in the context of an Oracle® based database—such as the database 26 in FIG. 2—for demonstrating the ETA computation approach.

Initially, a user may submit a query—such as the query 23 in FIG. 2—to the database 26 managed by the respective DBMS. The query submission aspect is illustrated through tasks 82-84 in FIG. 6. At task 83, the user may execute a query on the database system and the user's system (with or without the help of any intermediate systems) may submit the query to the database for execution (task 84). The database—more particularly, the database manager or DBMS—may execute the query to retrieve the records till it finishes the complete execution, as illustrated through tasks 85-87 in FIG. 6. While the query is processing (task 86), the results of ETA computation may be displayed to a user, as noted at task 88. The point "B" (identified using the reference numeral "89") in the flowchart 80 depicts repeat of the whole program in a cyclic manner until the query finishes executing.

It is noted here that the DQTE algorithm may be triggered throughout the time the query is running. The DQTE algorithm may operate in parallel with other programs—like the operating system and the database manager—involved in query execution. Furthermore, the DQTE algorithm also may perform certain operations similar to those performed by the OS or database manager for its independent assessment of the progress of a query. In particular embodiments, the program code for the DQTE functionality may be triggered as soon as the query is submitted to the database at task 84 in FIG. 6. As a result of such triggering (or activation), the DQTE module 22, like the OS, may read the query's execution plan tree from the V$Sql_Plan (or GV$Sql) view of the query using the user's Session_ID and SQL_ID, as outlined at task 90 in FIG. 6. The DQTE module in a non-Oracle® system may, however, use another command similar to the Oracle® system's V$Sql_Plan command to obtain a query's execution plan. The execution plan read at task 90 may remain as a base source of information to the DQTE algorithm throughout the execution of the query.

At task 91, the DQTE module may determine whether the query contains just one object access or not. If the answer is "yes", the flow proceeds to task 92, otherwise the flow proceeds to task 93 as shown in FIG. 6. The following is an example of an SQL query that contains just one object access:

Select Employee_Name, Employee_ID, Email_ID from EMPLOYEES;

If it is determined at task 92 that the query requires a Full Table Access (or Full Table Scan), then the DQTE algorithm may obtain the progress of the full table scan—in the form of the number of database rows processed as well as pending to be processed—from the V$Session_Longops (or GV$Session_Longops) internal view of the full table, as noted at task 94. It is understood that, in Oracle®, the V$Session_Longops view displays the status of various operations that run for longer than 6 seconds (in absolute time). Here, the V$Session_Longops command (or a similar command in other database management system) may be considered as a command to display a status of operations, each of which may take more than a threshold amount of time to execute on the full table. As discussed before, in particular embodiments, the DQTE module may send the information about query's progress to the operating system to enable the OS to show the progress to the user as indicated by tasks 86 and 88-89 in FIG. 6. On the other hand, if it is determined at task 92 that the query requires an Index Access (or Index Scan), then the DQTE algorithm may read the structure of the Index and "dump" (or read) the root node in the Index to figure out the possible binary nodes in the Index. A brief description of the block dumping mechanism is given below. As noted at task 95, the Index root block may be evaluated and the necessary binary nodes/blocks may be scanned to get the information of rows (or leaf blocks) under each binary node. Reading of each binary node may provide the total number of rows/blocks to be produced (or processed) for outcome of query execution. Additionally, as noted at task 96, the DQTE module may obtain the number of rows/blocks processed so far from the V$Sql_Plan_Monitor (or GV$Sql_Plan_Monitor) view of query execution. In Oracle®, the V$Sql_Plan_Monitor command displays plan level statistics for each SQL statement associated with the execution of the database query. This statistics may be updated every second when the statement executes. In other database systems, similar commands may be available to provide similar statistical information (which may be updated at every second or other threshold amount of time depending on the database system) associated with the execution of the database query. The statistical information obtained at task 96 may be used along with the total number of rows obtained at task 95 to compute the outstanding rows/blocks pending to be processed and the average rate of processing (RP, which is discussed before with reference to Equation-2) of records. As discussed before, in particular embodiments, the DQTE module may send the information about query's progress to the operating system to enable the OS to show the progress to the user. At task 97, the OS (or, in some embodiments, the DQTE module itself) may apply a time value for the time elapsed so far along with the numbers of rows already processed and pending to be processed to compute the ETA to complete the query. The OS may show the ETA progress to the user as indicated by blocks 86 and 88-89 in FIG. 6. At task 86, the DQTE algorithm may continue to check if the query is still running. If the answer is "yes", then the appropriate tasks are repeated through point "B" in the flowchart 80 till the query execution finishes.

It is noted here that the block "dumping" operation mentioned above is a technique that is supported by the Oracle® database to allow insights of the data organized with a data block/object. In some embodiments, the DQTE module may request the operating system (OS) to perform block dumping for the relevant data blocks selected by the DQTE module. Through block dumping, the dump files containing the header content of relevant data blocks may be generated on the OS in the RAW data format and/or HEX data format. The OS may transform the dump files obtained from the database manager (here, the Oracle® system) into a data format that is understandable by the DQTE module. Thus, using the "dump" operation with the assistance of the OS, the DQTE module may obtain (and process) the header content of various blocks from the database manager.

Referring again to task 91 in FIG. 6, if the DQTE module determines that the query contains access to more than one source object, the flow proceeds to task 93. The following is an example of an SQL query that contains more than one source object to retrieve data:

Select E.Employee_Name, E.Employee_ID, Email_I, D.Department_Name, D.Department_ID From Employees E, Departments D where E.Department_ID=D.Department_ID Order by E.Employee_ID;

At task 93, the DQTE module may evaluate each step in the query's execution plan tree to identify and create parent-child process(es) according to the execution plan and by the type/nature of the data reading mechanism of the currently-running query. Some examples of the reading mechanism are table scans, index scans, nested loops, hash joins, merge joins, sorting, and so on. At task 98, the DQTE-based processing may loop through the parent and child processes. The processing involved for the parent route 99 and that for the child route 100 are illustrated in more detail in the continuation portion of FIG. 6, which is discussed below.

It is noted here that a parent process is a step where it is having dependency to get data from one or more child processes. Furthermore, a parent process can control the Start/End of its child process. On the other hand, a child process is a step where it will do the actual reading of the source object, like a table read, an index read, a view read, a cluster read, and the like.

Generally, the DQTE module may loop through the parent and child processes to find out the progress of each step (in the execution plan) and consolidate a child process's progress to its respective parent, which will be finally merged at a point "A" 101 in the flowchart 80. The point "A" thus has details on the complete set of rows to produce on a whole query, as indicated at box 102 in FIG. 6. The details at box 102 include information on the Rate of Processing (RP), a value for the time elapsed so far, and rows already processed and pending to be processed. When parent/child process input feeds are combined at box 102, the available details allow the computation of the ETA for the query and its subsequent display to the user (box 88) through the point "B" 89 in the flowchart 80.

Referring now to the parent route 99 in the continuation portion of FIG. 6, at task 103, the DQTE module may compute the progress of the parent process. Some examples of parent processes include nested loops, hash joins, merge joins, sorts, and the like. If the parent process is a Sort operation, the Sort algorithm may be evaluated for the "n" value and the parent loop processed so far, as given by tasks 104-105. An example of the Sort operation may be: "Insertion Sort n value", which would give the information about the rows/blocks in the parent loop so far processed. If the parent process is a Join operation, the DQTE algorithm may get the progress of the Join by evaluating child processes (discussed later), as given by tasks 104, 106. If the parent process is a Set operation, the DQTE algorithm may evaluate the Set operation—such as the Minus operation, the Intersect operation, the Union operation, the UnionAll operation, and the like—on the total number of rows being processed (or pending to be processed) and already processed, as given by tasks 104, 107-108. If the parent process is a Distinct operation, the DQTE module may evaluate the Count-Distinct problem algorithm to find out the progress on the total number of rows already processed and pending to be processed, as given by tasks 104, 107, and 109. On the other hand, if the parent process is an Aggregate operation, the DQTE module may invoke statistical decision algorithms—like minimum (Min), maximum (Max), sum, and the like—to get the progress on the total number of rows/blocks already processed and pending to be processed, as given by tasks 104, 107, and 110. Parent operations other than those shown at tasks 105-106, and 108-110 may be similarly processed as well. Furthermore, as shown in FIG. 6, each parent task 105-106 and 108-110 is finally merged at point "A" 101.

Figure 9:
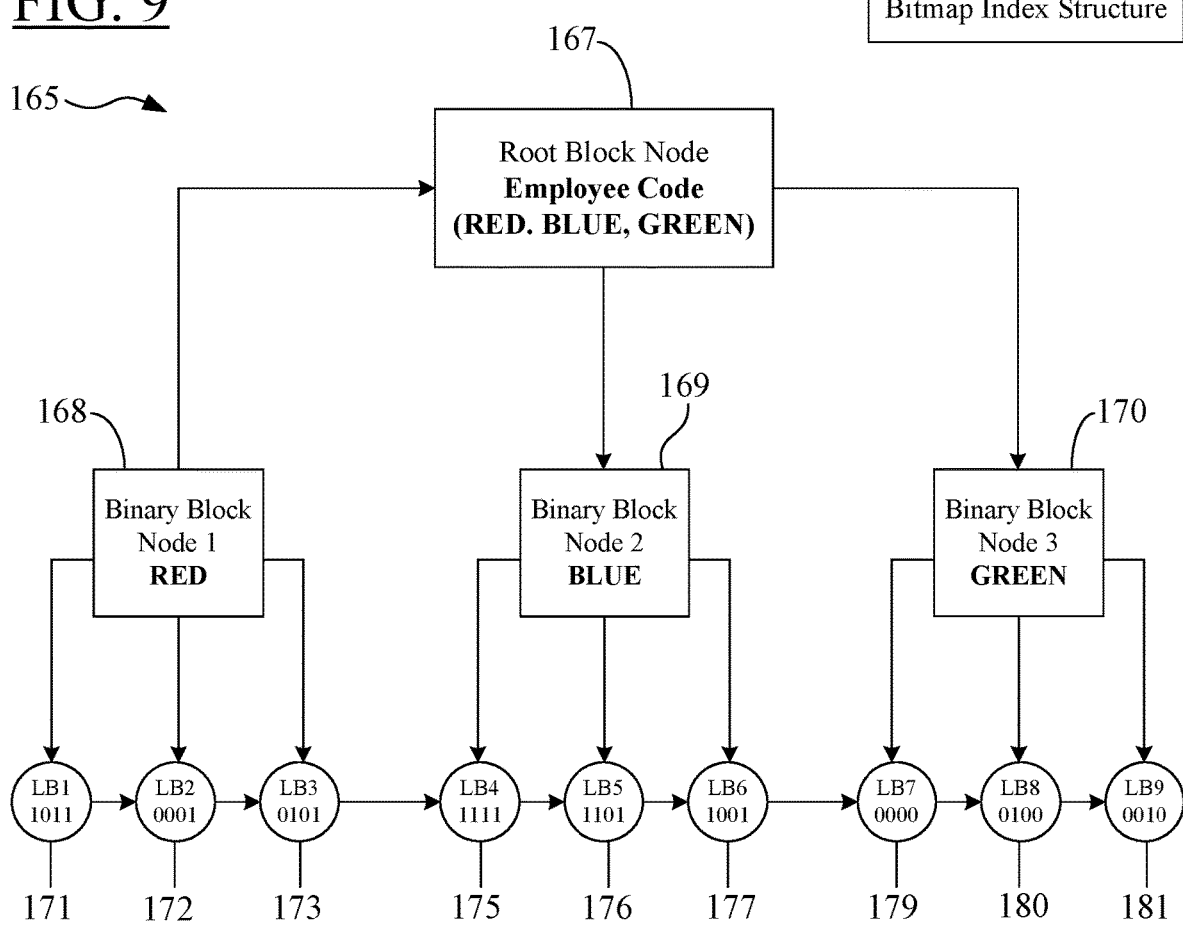
FIG. 9 is an example of a Bitmap index structure.
Figure 9:
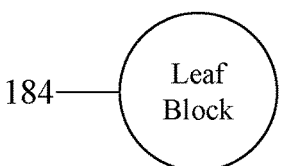
Figure 9:
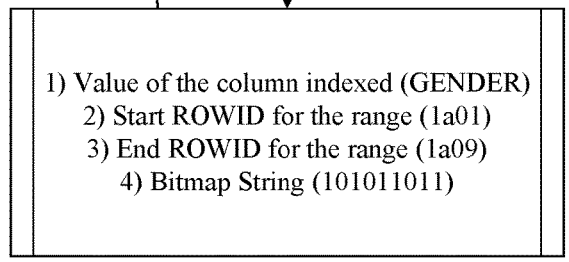
Figure 9:
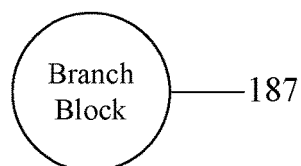
Figure 9:
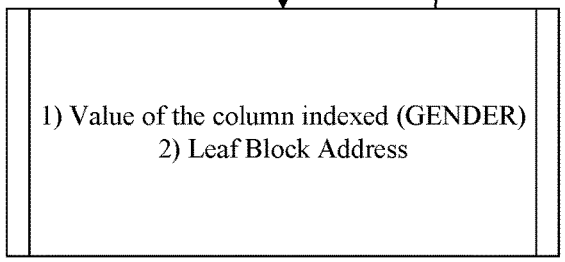
Figure 10:
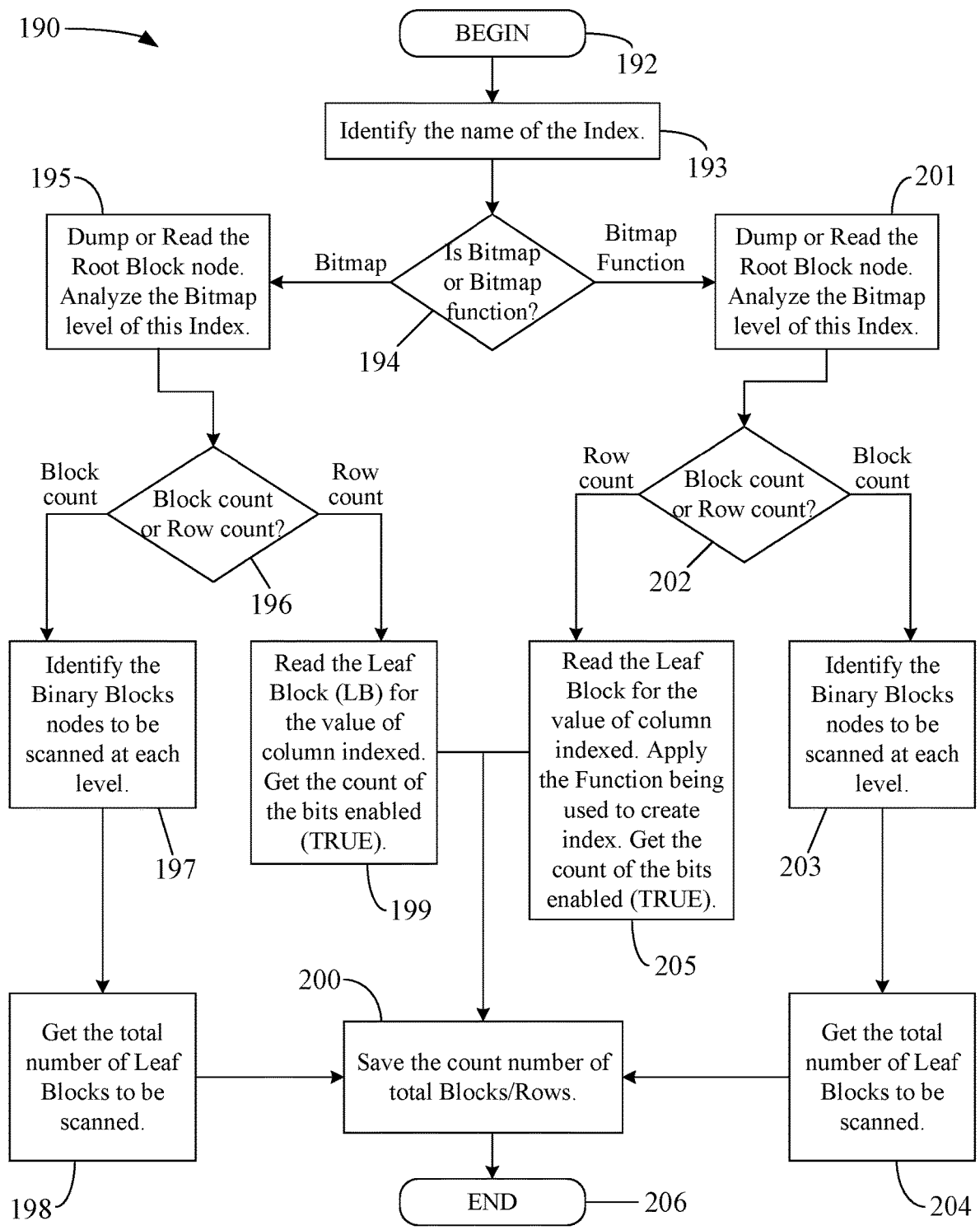
FIG. 10 shows an exemplary flowchart to evaluate a parent-child process in a Bitmap index scan using a DQTE module as per certain embodiments of the present disclosure.

Referring now to the child route 100 in the continuation portion of FIG. 6, at task 111, the DQTE module may compute the progress of the child process based on the data/object reading mechanism of the query. Some examples of the reading mechanisms include a Table access, an Index access, a Table access by RowID, and so on. If the child process is a View or Cube operation, the DQTE program may get the scan progress of the Views/Cube operation to find out the total number of rows already processed and pending to be processed, as given by tasks 112-113. If the child process is a Cluster scan, the DQTE algorithm may get the progress of the cluster scan to find out the total number of rows/blocks already processed and pending to be processed, as given by tasks 112, 114-115. If the child process is an Index scan, the DQTE module may evaluate the Index root block and scan the necessary binary block(s) to get information about rows or leaf blocks under each binary block/node to obtain the total number of rows to be produced/processed for query execution, as indicated by tasks 112, 114, and 116. FIGS. 7-10 (discussed later below) illustrate exemplary details of such root block evaluations in the context of a B-tree index structure (FIGS. 7-8) and a Bitmap index structure (FIGS. 9-10). Additionally, as also noted at task 116, the DQTE module may obtain from the corresponding parent process the number of rows/blocks processed so far using the V$Sql_Plan_Monitor (or GV$Sql_Plan_Monitor) view of query execution. The statistical information obtained at task 116 may be used to compute the outstanding rows/blocks pending to be processed and, hence, to compute the average rate of processing (RP) of records. For example, in one embodiment, RP=r/t, where the parameter "r" refers to the number of records processed so far as well as pending to be processed, and the parameter "t" refers to the elapsed time till now. On the other hand, if the child process is a Table scan, then the DQTE algorithm may obtain the progress of the full table scan—in the form of the number of database rows processed as well as pending to be processed—from the V$Session_Longops (or GV$Session_Longops) internal view of the full table, as noted at task 117. It is observed here that, in some embodiments, the task 117 may be similar to the task 94, whereas the task 116 may be similar to the combination of tasks 95-96.

Child operations other than those shown at tasks 113 and 115-117 may be similarly processed as well. Furthermore, as shown in FIG. 6, each child task 113 and 115-117 is finally merged at point "A" 101. As discussed before, in particular embodiments, the DQTE module may send the information about query's progress to the operating system to enable the OS to continuously show the progress on the ETA of the query to the user as indicated by tasks 101-102 and 88-89 in FIG. 6.

Figure 7:
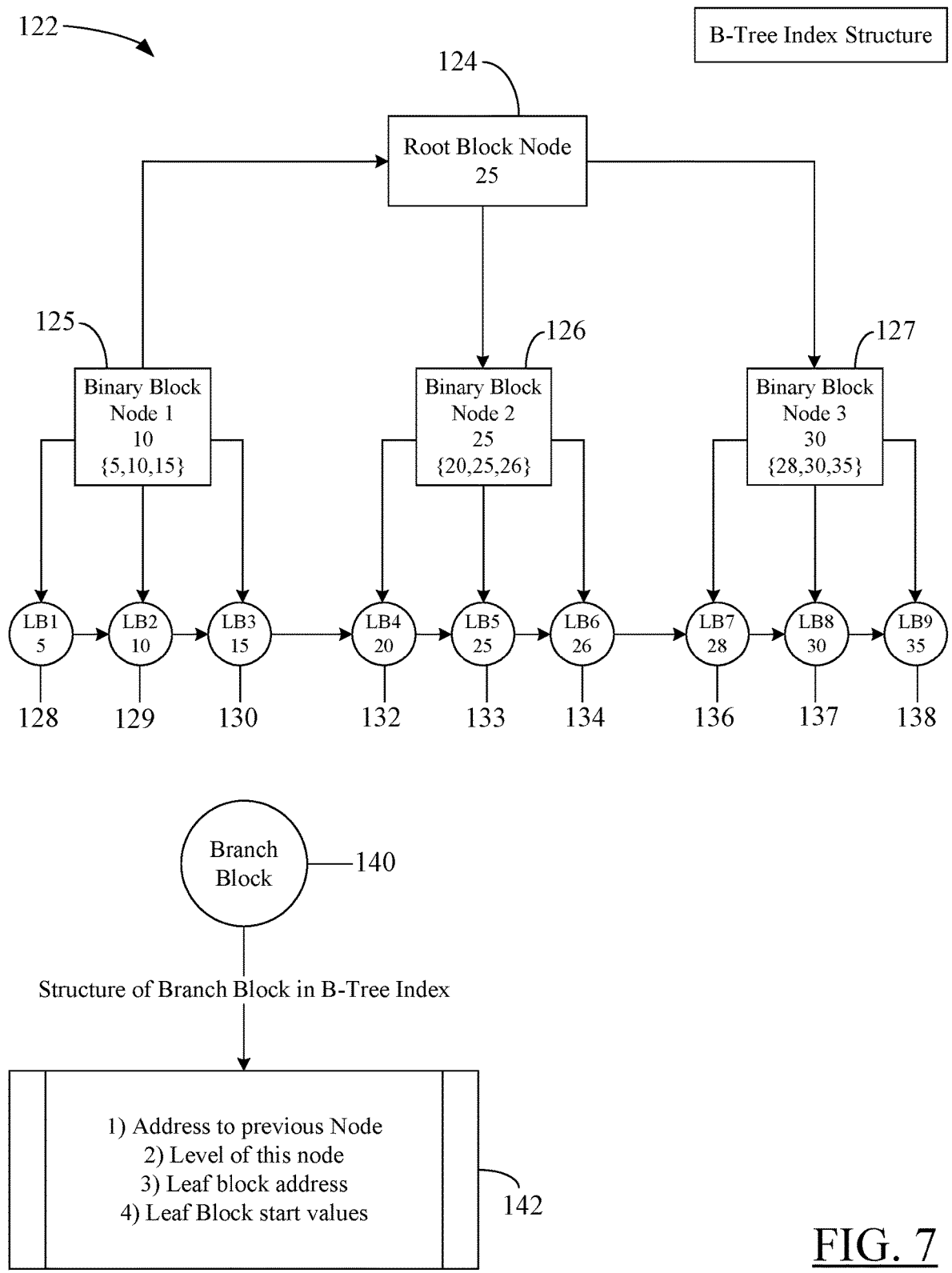
FIG. 7 is an example of a B-tree index structure.

FIG. 7 is an example of a B-tree index structure 122. The exemplary structure 122 in FIG. 7 is provided to facilitate discussion of the application of a DQTE module—such as the DQTE module 22 in FIG. 2—to a parent-child process as per particular embodiments of the present disclosure. As noted before, at run-time, the parent-child process—such as the structure 122 in FIG. 7—used by the DQTE module 22 may be different from that in the query's execution plan received from a database manager because the DQTE module 22 may categorize the parent and child processes based on the driving/driven state of them. In the example of FIG. 7, the B-tree index structure 122 has one parent or root block node 124 and three branch block nodes 125-127. Each of the binary branch block nodes 125-127 is shown to have three corresponding Leaf Block (LB) nodes 128-130, 132-134, and 136-138. The root block number—here, the number "25" written inside the root block 124—may determine which binary blocks need to be scanned. In FIG. 7, the binary block node 125 is internally identified by the number "10," the binary block node 126 is internally identified by the number "25", and the binary block node 127 is internally identified by the number "30." The number shown inside each LB may identify the LB start value, which is the record/row (or data block) in the database. For example, the number "5" shown in the header of the LB 128 may indicate that the LB 128 starts with a row/record in the corresponding database table at address "5". Thus, the headers of all of the leaf blocks collectively provide information about rows/records that need to be produced to completely process the query. The start values of all LBs associated with a branch node are also shown inside the respective branch node using braces "{ . . . }". For example, the respective starting value of each of the LBs 128-130 is shown inside the branch node 125 as part of the set of values "{5, 10, 15}". The index structure 122 illustrates the process flow using directional arrows interconnecting various nodes.

FIG. 7 also shows a generic branch block 140 and its structure (or header) 142 in a B-tree index. The branch block 140 may represent any of the binary block nodes 125-127. As shown, the structure/header 142 of the branch block 140 may include information such as, for example: (i) the address to a previous node, (ii) the hierarchical level of the branch node in the B-tree, (iii) the address of each leaf block of the branch block 140, and (iv) the start value of each leaf block associated with the branch block 140.

Figure 8:
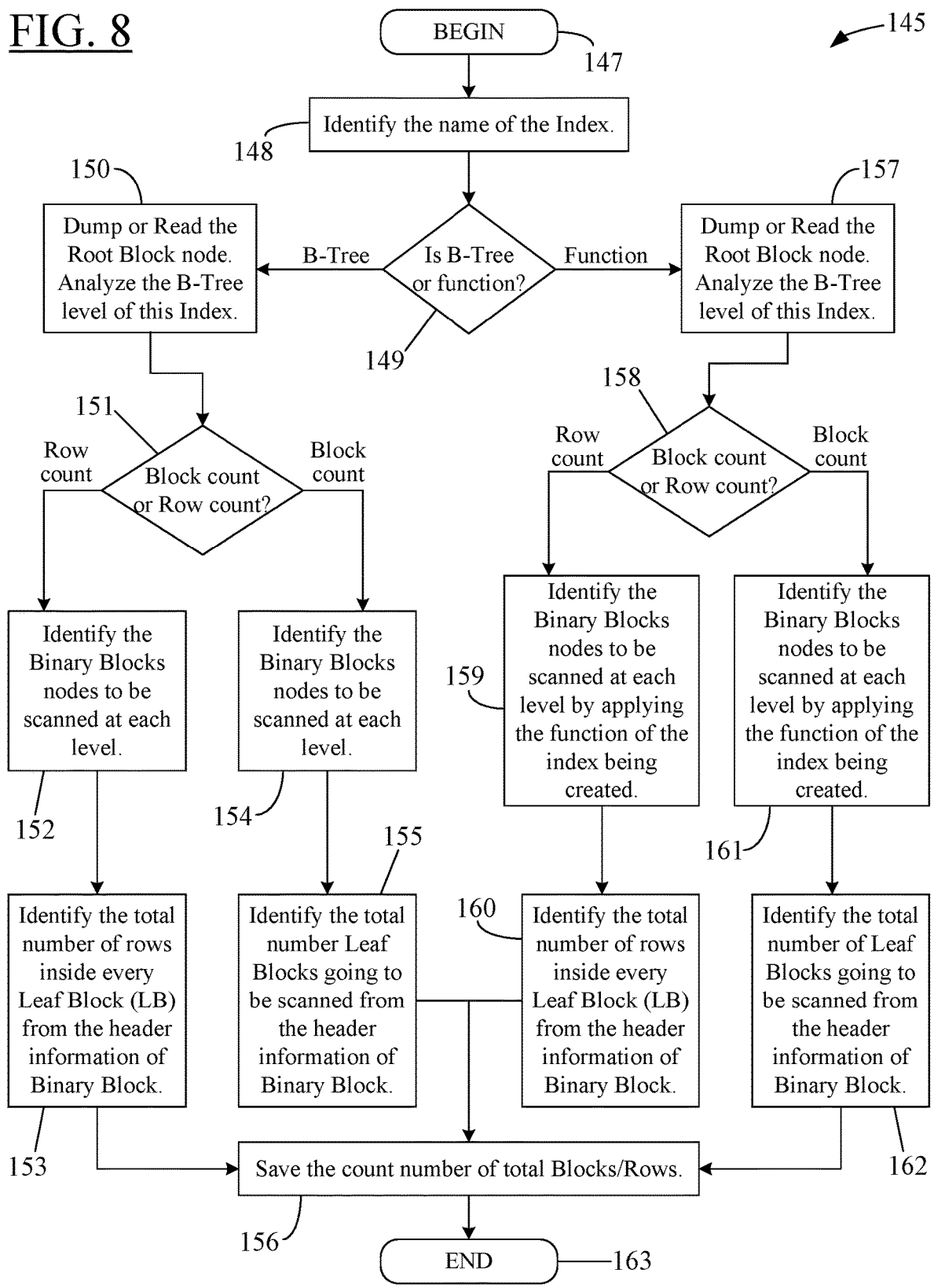
FIG. 8 shows an exemplary flowchart to evaluate a parent-child process in a B-tree index scan using a DQTE module as per certain embodiments of the present disclosure.

FIG. 8 shows an exemplary flowchart 145 to evaluate a parent-child process in a B-tree index scan using a DQTE module, such as the DQTE module 22 in FIG. 2, as per certain embodiments of the present disclosure. Generally, the tasks in the flowchart 145 may be used by the DQTE module 22 (operating in conjunction with the respective operating system) to evaluate the parent-child processes (like the one in FIG. 7) in a B-tree index to obtain the total number of rows/blocks that will be produced from the B-tree index scan. Because of the extensive discussion of the overall flowchart 80 in FIG. 6, only a brief discussion of the flowchart 145—which represents a portion of the general flowchart 80—is provided below.

Initially, at tasks 147-148, the DQTE module may identify the name of the index being used in the query. The name may be obtained from the execution plan of the query. Based on the retrieved name, the DQTE module may determine at task 149 whether the index is a B-tree or a function. If the index is a B-tree, the DQTE module may dump (or read) its root node block at task 150, which gives the B-tree level of the index and the immediate binary and leaf blocks it is linked with. The block dumping operation is already briefly explained before. Upon reading the root node details, the DQTE module may determine, at task 151, whether a block count or a row count is to be performed for the parent-child process associated with the root node. If a row count is to be performed, the DQTE module may first read the root node details to figure out the necessary binary block nodes to be scanned (or dumped/read) at each level in the parent-child process (task 152). Thereafter, at task 153, the DQTE module may analyze the header content of each binary block node to identify the total number of rows inside every leaf block (LB) associated with the respective binary block. Similarly, if a block count is to be performed, the DQTE module may first read the root node details to figure out the necessary binary block nodes to be scanned (or dumped/read) at each level in the parent-child process (task 154). Thereafter, at task 155, the DQTE module may analyze the header content of each binary block node to identify the total number of leaf blocks (LB s) that are going to be scanned for the respective binary block. At task 156, the count of the total number of outstanding records (rows)/blocks obtained at tasks 153 or 155 may be saved, for example, in a data structure and dumped into the OS to produce the total number of outstanding records/blocks. This number may be used to compute and display the ETA to complete the query. In one embodiment, this count of pending records/blocks may be given to the parent process so the parent process may be made aware of the number of rows/blocks to be produced.

If the index is a function, the DQTE module may dump (or read) its root node block at task 157, which gives the B-tree level of the index and the immediate binary and leaf blocks it is linked with. Then, the DQTE module may determine, at task 158, whether a block count or a row count is to be performed for the parent-child process associated with the root node. If a row count is to be performed, the DQTE module may first read the root node details and figure out the necessary binary block nodes to be scanned (or dumped/read) at each level in the parent-child process by applying the function of the index being created (task 159). Thereafter, at task 160, the DQTE module may analyze the header content of each binary block node to identify the total number of rows inside every leaf block (LB) associated with the respective binary block. Similarly, if a block count is to be performed, the DQTE module may first read the root node details and figure out the necessary binary block nodes to be scanned (or dumped/read) at each level in the parent-child process by applying the function of the index being created (task 161). Thereafter, at task 162, the DQTE module may analyze the header content of each binary block node to identify the total number of leaf blocks (LB s) that are going to be scanned for the respective binary block. At task 156, the count of the total number of records (rows)/blocks obtained at tasks 160 or 162 may be saved, for example, in a data structure and dumped into the OS to produce the total number of outstanding records/blocks. This number may be used to compute and display the ETA to complete the query. In one embodiment, this count of pending records/blocks may be given to the parent process so the parent process may be made aware of the number of rows/blocks to be produced. The operations in the flowchart 145 end at task 163.

As an example, the flowchart 145 may be applied to the B-tree index structure 122 of FIG. 7. In that case, the DQTE module may read the Root Node 25 (identified in FIG. 7 using the reference numeral "124") at task 150 to decide at task 152 that the binary blocks 125-127 are to be scanned. When scanning the binary block 125, the DQTE module may dump this block at task 153 to get information of the leaf blocks 128-130 and the row values {5, 10, 15} they contain. In this manner, the DQTE module may read/scan each binary block 125-127 to get information about the total number of rows inside their respective leaf blocks pending to be produced for query execution.

FIG. 9 is an example of a Bitmap index structure 165. Although FIGS. 7 and 9 show two different types of index structures, there is substantial similarity between them. Hence, only a brief discussion of FIG. 9 is provided because of the earlier extensive discussion of FIG. 7. As in case of FIG. 7, the DQTE module 22 may be applied to the parent-child process shown in FIG. 9, an example of which is discussed later with reference to FIG. 10. At run-time, the parent-child process—such as the structure 165 in FIG. 9—used by the DQTE module may be different from that in the query's execution plan received from a database manager. In the example of FIG. 9, the Bitmap index structure 165 has one parent or root block node 167 and three branch block nodes 168-170. Each of the binary branch block nodes 168-170 is shown to have three corresponding Leaf Block (LB) nodes 171-173, 175-177, and 179-181. The root block content—here, the "Red", the "Blue", and the "Green" values for the table parameter "Employee Code"—may determine which binary blocks need to be scanned. In FIG. 9, the binary block node 168 is internally identified by the value "Red", the binary block node 169 is internally identified by the value "Blue", and the binary block node 170 is internally identified by the value "Green." Thus, these three binary blocks 168-170 will need to be scanned for the root node 167. The binary number shown in the header of each LB is a bitmap string to identify which records are enabled in the LB. The binary bit "1" may indicate a corresponding row/record is enabled, whereas the binary bit "0" may indicate that the corresponding row/record is disabled. For example, the hexadecimal (Hex) binary number "1011" shown in the LB 171 may indicate that three records are enabled and one is disabled. Hence, counting all the 1's in the header of the LB 171 may provide the count of the rows/records to be scanned for query execution. Thus, the headers of all of the leaf blocks collectively provide information about rows/records that need to be produced to completely process the query. The index structure 165 illustrates the process flow using directional arrows interconnecting various nodes.

FIG. 9 also shows a generic leaf block 184 and its structure 185, as well as a generic branch block 187 and its structure 188 in a bitmap index. The leaf block 184 may represent any of the LBs 171-173, 175-177, and 179-181. As shown, the structure 185 of the LB 184 may include information such as, for example: (i) the value of the column indexed, such as a "Gender" column in a table; (ii) start RowID (for example, RowID=1a01 hex) for the range of rows associated with the LB 184; (iii) end RowID (for example, RowID=1a09 hex) for the range of rows associated with the LB 184; and (iv) a bitmap string (for example, the binary value "101011011") identifying the rows/records enabled in the LB 184 for the corresponding column indexed. The branch block 187 may represent any of the binary block nodes 168-170. As shown, the structure 188 of the branch block 187 may include information such as, for example: (i) the value of the column indexed, such as a "Gender" column in a table; and (ii) the address of each leaf block of the branch block 187.

FIG. 10 shows an exemplary flowchart 190 to evaluate a parent-child process in a Bitmap index scan using a DQTE module, such as the DQTE module 22 in FIG. 2, as per certain embodiments of the present disclosure. Generally, the tasks in the flowchart 190 may be used by the DQTE module 22 (operating in conjunction with the respective operating system) to evaluate the parent-child processes (like the one in FIG. 9) in a bitmap index to obtain the total number of rows/blocks that will be produced from the bitmap index scan. Because of the extensive discussion of the overall flowchart 80 in FIG. 6 and a detailed discussion of a similar flowchart 145 in FIG. 8, only a brief discussion of the flowchart 190—which represents a portion of the general flowchart 80—is provided below.

Initially, at tasks 192-193, the DQTE module may identify the name of the index being used in the query. The name may be obtained from the execution plan of the query. Based on the retrieved name, the DQTE module may determine at task 194 whether the index is a bitmap index or a bitmap function. If the index is a bitmap index, the DQTE module may dump (or read) its root node block at task 195, which gives the bitmap level of the index and the immediate binary and leaf blocks it is linked with. The block dumping operation is already briefly explained before. Upon reading the root node details, the DQTE module may determine, at task 196, whether a block count or a row count is to be performed for the parent-child process associated with the root node. If a block count is to be performed, the DQTE module may first read the root node details to figure out the necessary binary block nodes to be scanned (or dumped/read) at each level in the parent-child process (task 197). Thereafter, at task 198, the DQTE module may analyze the header content of each binary block node to identify the total number LBs to be scanned for the respective binary block. As discussed with reference to the leaf block 184 in FIG. 9, the header of each identified leaf block may be read to obtain the count of the total number of outstanding records (rows)/blocks. On the other hand, if a row count is to be performed at task 196, the DQTE module may read each relevant LB linked with the root block node for the value of the column indexed. As noted at task 199 (and also discussed with reference to FIG. 9), reading of the header of each LB may provide the count of the bits—that is, rows or records—enabled (logic "true") in the LB for the corresponding column. At task 200, the count of the total number of records (rows)/blocks obtained at tasks 198 or 199 may be saved, for example, in a data structure and dumped into the OS to produce the total number of outstanding records/blocks. This number may be used to compute and display the ETA to complete the query. In one embodiment, this count of pending records/blocks may be given to the parent process so the parent process may be made aware of the number of rows/blocks to be produced.

If the index is a bitmap function, the DQTE module may dump (or read) its root node block at task 201, which gives the bitmap level of the index and the immediate binary and leaf blocks it is linked with. Then, the DQTE module may determine, at task 202, whether a block count or a row count is to be performed for the parent-child process associated with the root node. If a block count is to be performed, the DQTE module may first read the root node details to figure out the necessary binary block nodes to be scanned (or dumped/read) at each level in the parent-child process (task 203). Thereafter, at task 204, the DQTE module may analyze the header content of each binary block node to identify the total number LBs to be scanned for the respective binary block. As discussed with reference to the leaf block 184 in FIG. 9, the header of each identified leaf block may be read to obtain the count of the total number of outstanding records (rows)/blocks. On the other hand, if a row count is to be performed at task 202, the DQTE module may read, at task 205, each relevant LB linked with the root block node for the value of the column indexed. As noted at task 205 (and also discussed with reference to FIG. 9), the DQTE module also may apply the function of the index being created to obtain the count of the bits—that is, rows or records—enabled (logic "true") in the LB for the corresponding column. At task 200, the count of the total number of records (rows)/blocks obtained at tasks 204 or 205 may be saved, for example, in a data structure and dumped into the OS to produce the total number of outstanding records/blocks. This number may be used to compute and display the ETA to complete the query. In one embodiment, this count of pending records/blocks may be given to the parent process so the parent process may be made aware of the number of rows/blocks to be produced. The operations in the flowchart 190 end at task 206.

As an example, the flowchart 190 may be applied to the bitmap index structure 165 of FIG. 9. In that case, the DQTE module may read the Root Node 167 (FIG. 9) at task 195 to decide that the binary blocks 168-170 are to be scanned. When scanning or analyzing the binary block 168, the DQTE module may dump this block to get the address of its leaf block nodes 171-173 so that the DQTE module may obtain the information about the rows/blocks inside the leaf nodes. As discussed before with reference to FIG. 9, the header in an LB may contain binary bits/flags (or bitmap string) of the bitmap index identifying the rows/records enabled in the LB for the corresponding column indexed. Thus, at task 199 (FIG. 10), the DQTE module may read each leaf block node to evaluate the records which are enabled for the value of the column indexed—here, the value "RED". In one embodiment, as noted before, a binary bit "1" may indicate that the corresponding record/row is RED-enabled and a binary bit "0" may indicate that the corresponding record/row is RED-disabled. In this manner, the DQTE module may read/scan each leaf node 171-173, 175-177, and 179-181 for the respective column value to get information about the total number of rows pending to be produced for query execution.

It is noted here that sub-algorithms similar to those shown in FIGS. 8 and 10 may be devised for other parent-child processes as well. Some examples of such processes include Joins like Hash Joins, Sort Joins, Merge and other types of Joins; Sorts including Merge, Bubble, Quick, Insertion, Selection and other types of Sorts; and Set operations like Union, Union All, Minus, Intersect, and Except. All of these data structures are within the scope of DQTE as per particular embodiments of the present disclosure. The counter value "i" (discussed below) may be monitored in these sub-algorithms while the query execution and the processing percentage may be captured by the DQTE module. The two scenarios given below open up the logic of capturing the counter "i" for calculating the ETA of a query.

Scenario 1) Insertion Sort percentage calculation

```
For i = 1 to length (A) --where A is an array
    j = i
    while A[j] and A[j-1]
        j=j -1
    end while
end For
```

While the above Insertion sorting sub-algorithm is in execution, the counter values "i" may be monitored by the DQTE module and the ETA of sorting may be consolidated to the overall query execution.

Scenario 2) Hash Join percentage calculation

```
let A = the first input table (or ideally, the larger one)
let B = the second input table (or ideally, the smaller one)
let jA = the join column ID of table A
let jB = the join column ID of table B
let MB = a multimap for mapping from single values to multiple rows of table B (starts out empty)
let C = the output table (starts out empty)
for each row i in table B:
    place i in multimap MB under key i(jB)
for each row i in table A:
    for each row b in multimap MB under key i(jA):
        let c = the concatenation of row a and row b
        place row c in table C
```

The ETA calculation of hash in the above hash join sub-algorithm may be based on two phases—hashing and probing. The DQTE module may consolidate the combination time of these two phases to the overall execution of the query.

The following discussion provides two case studies to explain how the DQTE algorithm as per teachings of the present disclosure may work in practice. The case studies further illuminate how current database management systems, like Oracle®, cannot produce ETA and how the DQTE module as per teachings of the present disclosure is able to compute it.

Case 1: Nested Loop Join, Full Table Access, B-Tree Index Access

This case relates to a user query that requested the details of employees and their departments. The user had restricted the query to the departments SALES and HR only. Below is the query and the execution plan of the query, where the Employee table is going for the Full Table scan and the Departments table is going for the B-Tree scan.

Query:
    Select E.Employee_ID, E. Employee_Name, D.Department_ID, D.Department_Name from Employees E, Departments D where E.Department_ID= D.Department_ID and D.Department_Code in (SALES, HR);

Execution Plan:

```
5 Select Statement
    1 Nested Loops
        3 Table Access by Index Rowid   DEPARTMENTS
        2 Index Range Scan              DEPARTMENTS_INDEX
        4 Table Access FULL             EMPLOYEES
```

It is seen from the above execution plan that the join method chosen by the optimizer in the Oracle® database manager is Nested Loops and the access paths are: (1) for the DEPARTMENT table, the access path is Index Range Scan, and (2) for the EMPLOYEES table, it is Full Table Scan. Thus, for each row returned from the Index range scan, the Employees table is scanned to retrieve the records which are satisfying the join column condition. The following describes how the current system and the Estimator (DQTE) handled the ETA of the query.

Current System (Oracle®): Was able to only show the progress of the full table scan of the EMPLOYEES table. Because of this, only a technical user could see the progress of full table scan from V$Session_Longps view, and it is continuous loop operation. The user does not know how many times the full table scan happens. Similarly, the user cannot be sure as to how many records will be produced from the driving table DEPARTMENTS.

With DQTE: The DQTE module was able to read the index internal structure and transform the binary and leaf blocks in the Oracle® B-tree index to program usage. (More details in this regard may be obtained from the discussion of FIGS. 7-8.) As a result, the DQTE module was able to compute the number of rows to be returned for the query. In the query example above, the DQTE module had the Nested Loop Join as the Parent process with only one Child process. The parent process was driving only one table—the DEPARTMENTS table—and the access path to get data from that table was B-Tree Index. The contents of the binary blocks having information of SALES and HR were dumped by the DQTE module into the Operating System of the host and were analyzed by the OS to produce the total number of outstanding records. Now the Parent process knew how many rows are going to come. Based on this information, the ETA=(Total No of Rows*Time taken so far)/(Rows processed so far). Similarly, the Rate of rows Processing, RP=(Total rows processed so far/Time taken so far).

Case 2: Nested Loop Join, Bitmap Index Access, B-Tree Index Access

This case relates to a use query that requested the details of employees and their departments. The user had restricted the query to the departments SALES and HR only, and only of those Employees whose manager was James. Below is the query and the execution plan of the query, where the Employee table is having a Bitmap index on Manger Name and is going for the Bitmap Index Scan, whereas the Departments table is going for the B-Tree Index scan.

Query:
    Select E.Employee_ID, E. Employee_Name, D.Department_ID, D.Department_Name from Employees E, Departments D where E.Department_ID=D.Department_ID and D.Department_Code in (SALES, HR) and E.ManagerName=James;

Execution Plan:

```
6 Select Statement
    1 Nested Loops
        3 Table Access by Index Rowid    EMPLOYEES
        2 Bitmap conversion to Rowid
            1 Bitmap Index (Range Scan)  EMPLOYEES_INDEX
        5 Table Access by Index Rowid    DEPARTMENTS
            4 Index Range Scan           DEPARTMENTS_INDEX
```

It is seen from the above execution plan that the join method chosen by the optimizer in the Oracle® database manager is Nested Loops and the access paths are: (1) for DEPARTMENT table, the access path is Index Range Scan, and (2) for the EMPLOYEES table, it is Bitmap Index Scan. Thus, for each row returned from the Bitmap index scan, the Departments_Index is scanned to retrieve the records which are satisfying the join column condition. The following describes how the current system and Estimator (DQTE) handled the ETA of the query.

Current System (Oracle®): Could not show the progress of both the Index scans in V$Session_Longps view or in any other place of database. It also could not provide any clue of the outstanding records in each step.

With DQTE: The DQTE module was able to read the index internal structure and transform the binary and leaf blocks in the Oracle® B-tree and Bitmap index scans to program usage. (More details in this regard may be obtained from the discussion of FIGS. 7-10.) As a result, the DQTE module was able to compute the number of rows to be returned for the query. In the query example above, the DQTE module had the Nested Loop Join as the Parent process with only one child process, the Bitmap Index access. The contents of the binary blocks (having details of leaf blocks) and the contents of the leaf blocks (having information of the Indexed value (James)) were dumped by the DQTE module into the Operating System of the host and were analyzed by the OS to produce the total number of outstanding records. Based on this information, the ETA= (Total No of Rows*Time take so far)/(Rows processed so far). Similarly, Rate of rows Processing, RP=(Total rows processed so far/Time taken so far).

From the above case studies, it was observed that the current Oracle® system was not capable to tell ETA or Outstanding Records to be processed. Hence, the user was not able to know the estimated time left to complete the query. On the other hand, with the DQTE tool as per teachings of the present disclosure, the host system was able to show the estimated time to the user and also the count of outstanding/pending rows to be processed. The DQTE module is a lightweight program in processing because it may not read all the data blocks or the entire content of the data blocks like a database software (DBMS). Rather, the DQTE module may target only the master/header blocks of a relevant database object as required; just a single block read and related computing may give the signature and complete snapshot of the object. The DQTE tool can thus assist not only the database developers, but also non-technical users, who can see the estimated time to complete their queries at run-time.

FIG. 11 illustrates an example configuration of a computing device (or computer system) 210 that can be used to implement the systems and techniques described herein. In particular embodiments, the computing device 210 may be the host computer system 24 shown in FIG. 2, which may or may not include the database 26 as part of the memory or peripheral storage thereof. The computer system 210 may be suitably configured to implement the ETA computation functionality according to the teachings of the present disclosure. The computing device 210 may include one or more processors 212, a memory unit 214, an interface unit 216 providing communication interfaces, one or more input devices 218, one or more output devices 220, and a peripheral storage unit 222, connected to the processor 212 as shown and configured to communicate with each other, such as via one or more system buses (not shown) or other suitable connection.

In one embodiment, the input devices 218 may provide data inputs—such as user input like database queries, camera images, statistical data, and the like—to the processor 212 for further processing. The input devices 218 may include, for example, a touchpad, a camera, a proximity sensor, a Global Positioning System (GPS) sensor, a computer keyboard, a touchscreen, a joystick, a physical or virtual "clickable button," a computer mouse/pointing device, and the like. A display screen is an example of the output device 220. Other examples of an output device include a graphics/display device, a computer screen or monitor, an alarm system, or any other type of data output device. In some embodiments, the input device(s) 218 and the output device(s) 220 may be coupled to the processor 212 via an I/O or peripheral interface(s). In some embodiments, the computer system 210 may include more than one instance of the devices shown. In various embodiments, all of the components shown in FIG. 11 may be housed within a single housing. In other embodiments, the computer system 210 may not include all of the components shown in FIG. 11. Furthermore, the computing device 210 may be configured as a standalone system, as a server system, as a client system, or in any other suitable form factor.

The processor 212 is a hardware device that may include a single processing unit or a number of processing units, all of which may include single or multiple computing units or multiple cores. When the computing device 210 is a multiprocessor system, there may be more than one instance of the processor 212 or there may be multiple processors coupled to the processor 212 via their respective interfaces (not shown). The processor 212 may include an integrated Graphics Processing Unit (GPU) or the GPU may be a separate processor device in the host system 210. The processors 1002 may be implemented as one or more microprocessors, microcomputers, microcontrollers, Digital Signal Processors (DSPs), Central Processing Units (CPUs), Graphics Processing Units (GPUs), state machines, logic circuitries, and/or any devices that manipulate signals based on operational instructions. Among other capabilities, the processor 212 may be configured to fetch and execute computer-readable instructions stored in the memory 214, the peripheral storage 222, or other computer-readable media. In some embodiments, the processor 212 may be a System on Chip (SoC).

The memory 214 and the peripheral storage unit 222 are examples of non-transitory computer media (e.g., memory storage devices) for storing instructions that can be executed by the processor 212 to perform the various functions described herein. For example, the memory unit 214 may include both volatile memory and non-volatile memory (e.g., RAM, ROM, or the like) devices. Further, in particular embodiments, the peripheral storage unit 222 may include one or more mass storage devices such as, for example, hard disk drives, solid-state drives, removable media, including external and removable drives, memory cards, flash memory, floppy disks, optical disks (e.g., CD, DVD), a storage array, a network attached storage, a storage area network, or the like. Both memory 214 and mass storage devices constituting the peripheral storage 222 may be collectively referred to as memory or computer storage media herein, and may be a media capable of storing computer-readable, processor-executable program instructions as computer program code that can be executed by the processor 214 as a particular machine configured for carrying out the operations and functions described in the implementations herein.

In some embodiments, a database, like the database 26 in FIG. 2, may be a part of the memory of the computing device 210. In other embodiments, the database may be external to the computing device 210. When the computer system 210 includes a database, the database may form a part of the memory unit 214 or the peripheral storage 222. Furthermore, the program code of the relevant database management system (RDBMS) also may be stored in the system memory 214 and/or the peripheral storage unit 222 for execution by the processor 212.

The computing device 210 may also include one or more communication interfaces as part of its interface unit 216 for exchanging data via a network. The communication interfaces can facilitate communications within a wide variety of networks and protocol types, including wired networks (e.g., Ethernet, Digital Subscriber Loop (DSL), Data Over Cable Service Interface Specification (DOCSIS), Fiber Optics network, Universal Serial Bus (USB), etc.) and wireless networks (e.g., Wireless Local Area Network (WLAN), Global System for Mobile Communications (GSM), Code Division Multiple Access (CDMA), Institute of Electrical and Electronics Engineers (IEEE) standard 802.11, Bluetooth®, Wireless USB, cellular, satellite, etc.), the Internet and the like. Communication interfaces in the interface unit 216 can also provide communication with external storage (not shown), such as in a storage array, network attached storage, storage area network, one or more databases, or the like.

The computer storage media, such as the memory 214 and the mass storage devices in the peripheral storage 222, may be used to store software and data. For example, the computer storage media may be used to store the operating system (OS) for the host computer 210, various device drivers for the host 210, and the data such as audio content, video content, text data, streaming content, or any other type of content. The computer storage media also may store software applications such as a word processing application, a spreadsheet application, and the like. The program code for the software applications and the OS may be executed by the processor 212. In one embodiment, a non-transitory, computer-readable data storage medium, such as, for example, the system memory 214 or the peripheral data storage unit 222 may store program code or software for a DQTE module 224 as per particular embodiments of the present disclosure. In the embodiment of FIG. 11, the system memory 214 is shown to include such program code. In some embodiments, the DQTE module 224 may represent the DQTE module 22 in FIG. 2. The DQTE module 224 may operate in conjunction with the host OS as well as the existing database manager. The processor 212 may be configured to execute the program code for the DQTE module 224, whereby the computing device 210 may be operative to perform various query-processing tasks associated with the ETA and RP computation methodology as per the teachings of the present disclosure. In one embodiment, such tasks may include, for example, the process steps illustrated in FIGS. 4, 6, 8, and 10. Such tasks also may include, for example, relevant host-based operations discussed earlier with reference to FIGS. 2 and 5. The program code or software for the DQTE module 224 may be proprietary software or open source software which, upon execution by the processor 212, may enable the computer system 210 to perform operations to support the runtime calculation and display of the ETA (and, optionally, the RP) to complete a query as per teachings of the present disclosure.

In particular embodiments, the computing device 210 may include an on-board power supply unit 225 to provide electrical power to various system components illustrated in FIG. 11. The power supply unit 225 may receive batteries or may be connectable to an AC electrical power outlet. In one embodiment, the power supply unit 225 may convert solar energy or other renewable energy into electrical power.

The example systems and computing devices described herein are merely examples suitable for some implementations and are not intended to suggest any limitation as to the scope of use or functionality of the environments, architectures and frameworks that can implement the processes, components and features described herein. Thus, implementations herein are operational with numerous environments or architectures, and may be implemented in general purpose and special-purpose computing systems, or other devices having processing capability, and, hence, are considered machine-implemented. Generally, any of the functions described with reference to the figures can be implemented using software, hardware (e.g., fixed logic circuitry) or a combination of these implementations. The term "module," "mechanism" or "component" as used herein generally represents software, hardware, or a combination of software and hardware that can be configured to implement prescribed functions. For instance, in the case of a software implementation, the term "module," "mechanism" or "component" can represent program code (and/or declarative-type instructions) that performs specified tasks or operations when executed on a processing device or devices (e.g., CPUs or processors). The program code can be stored in one or more computer-readable memory devices or other computer storage devices. Thus, the processes, components and modules described herein may be implemented by a computer program product.

Furthermore, this disclosure provides various example implementations or embodiments, as described and as illustrated in the drawings. However, this disclosure is not limited to the implementations described and illustrated herein, but can extend to other implementations, as would be known or as would become known to those skilled in the art. Reference in the specification to "one embodiment," "particular embodiments," "this implementation," "some embodiments", or other terms of similar import, means that a particular feature, structure, or characteristic described is included in at least one implementation or embodiment, and the appearances of these phrases in various places in the specification are not necessarily all referring to the same implementation/embodiment.

Although the present disclosure has been described in connection with several embodiments, the disclosure is not intended to be limited to the specific forms set forth herein. On the contrary, it is intended to cover such alternatives, modifications, and equivalents as can be reasonably included within the scope of the disclosure as defined by the appended claims.

What is claimed is:
1. A method comprising:
   obtaining, by a computing system, an execution plan for a database query received by a database associated with the computing system;

based at least in part on the execution plan, identifying, by the computing system, each source object to be accessed in the database to execute the database query;

based on each source object, determining by the computing system:
- statistical information associated with the execution of the query,
- a query-specific first number of data rows or blocks in the database to be processed to execute the database query, and
- a query-specific second number of data rows or blocks in the database already processed during execution of the database query; and estimating, by the computing system, a completion time of the database query based at least in part on:
- statistical information associated with the execution of the query,
- the query-specific first number of data rows or blocks in the database to be processed to execute the database query,
- the query-specific second number of data rows or blocks in the database already processed during execution of the database query, and
- a time value for time elapsed prior to completion of the execution of the database query to process the query-specific second number of data rows or blocks.

2. The method of claim 1, wherein the database comprises a distributed database.

3. The method of claim 1, further comprising:
displaying, by the computing system, the estimated completion time of the database query while the database query is being executed.

4. The method of claim 1, wherein estimating the completion time comprises:
providing the query-specific first number, the query-specific second number, and the time value to an operating system of the computing system to enable the operating system to estimate the completion time of the database query.

5. The method of claim 1, wherein each source object comprises at least one of the following:
a table;
an index;
a view;
a cluster; and
a function.

6. The method of claim 1, wherein identifying each source object includes:
determining that only a single source object is to be accessed, wherein the single source object is a full table;
and wherein determining the query-specific first and second numbers includes:
determining the query-specific first and second numbers using a command to display a status of operations that take more than a threshold amount of time to execute on the full table.

7. The method of claim 1, wherein:
identifying each source object comprises:
determining that only a single source object is to be accessed, wherein the single source object comprises an index; and
determining the query-specific first and second numbers comprises:
reading a structure of the index to identify one or more root nodes associated with the index;
determining one or more binary nodes associated with each corresponding root node;
reading header information of each binary node to obtain the query-specific first number; and
computing the query-specific second number by using the query-specific first number in conjunction with statistical information associated with the execution of the database query.

8. The method of claim 1, wherein:
identifying each source object comprises:
determining that more than one source object is to be accessed;
and
determining the query-specific first and second numbers comprises:
creating a corresponding parent-child process for at least one source object;
looping each created parent-child process to consolidate progress of a child process into a respective parent process to obtain from the respective parent process a process-specific first number of data rows or blocks in the database pending to be processed for the execution of the database query; and
for each created parent-child process, computing a process-specific second number of data rows or blocks in the database already processed during execution of the database query by using the process-specific first number in conjunction with statistical information associated with the execution of the database query.

9. The method of claim 8, wherein determining the query-specific first and second numbers includes performing at least one of the following:
adding all process-specific first numbers to obtain the query-specific first number; and
adding all process-specific second numbers to obtain the query-specific second number.

10. The method of claim 1, wherein obtaining the execution plan for the query comprises:
obtaining the execution plan using a database command.

11. A computing system comprising:
a memory storing program instructions; and
a processing unit coupled to the memory and operable to execute the program instructions, which, when executed by the processing unit, cause the computing system to perform the following:
obtain an execution plan for a database query received by a database associated with the computing system,
based at least in part on the execution plan, identify each source object to be accessed in the database to execute the database query,
based on each source object, determine:
statistical information associated with the execution of the query,
a query-specific first number of data rows or blocks in the database to be processed to execute the database query, and
a query-specific second number of data rows or blocks in the database already processed during execution of the database query, and
estimate a completion time of the database query based at least in part on:
statistical information associated with the execution of the query,
the query-specific first number of data rows or blocks in the database to be processed to execute the database query, the query-specific second number of data rows or blocks in the database already processed during execution of the database query, and
a time value for time elapsed prior to completion of the execution of the database query to process the query-specific second number of data rows or blocks.

12. The computing system of claim 11, wherein the program instructions, upon execution by the processing unit, cause the computing system to perform the following:
take a respective snapshot of header information associated with each source object to determine the query-specific first and second numbers.

13. The computing system of claim 11, wherein the memory is configured to store an operating system of the computing system,
and wherein the program instructions, upon execution by the processing unit, cause the computing system to provide the query-specific first number, the query-specific second number, and the time value to the operating system to enable the operating system to estimate the completion time of the database query.

14. The computing system of claim 11, wherein the program instructions, upon execution by the processing unit, cause the computing system to:
determine that more than one source object is to be accessed; and
further perform the following as part of determining the query-specific first and second numbers:
create a corresponding parent-child process for at least one source object;
loop each created parent-child process to consolidate progress of a child process into a respective parent process to obtain from the respective parent process a process-specific first number of data rows or blocks in the database pending to be processed for the execution of the database query; and
for each created parent-child process, compute a process-specific second number of data rows or blocks in the database already processed during the execution of the database query by using the process-specific first number in conjunction with statistical information associated with the execution of the database query.

15. The computing system of claim 11, wherein the program instructions, upon execution by the processing unit, cause the computing system to:
determine that only a full table is to be accessed as a source object; and
further perform the following as part of determining the query-specific first and second numbers:
determine the query-specific first and second numbers using a command to display a status of operations that take more than a threshold amount of time to execute on the full table.

16. The computing system of claim 11, wherein the program instructions, upon execution by the processing unit, cause the computing system to:
determine that only an index is to be accessed as a source object; and
further perform the following as part of determining the query-specific first and second numbers:
read a structure of the index to identify one or more root nodes associated with the index;
determine one or more binary nodes associated with each corresponding root node;
read header information of each binary node to obtain the query-specific first number; and
compute the query-specific second number by using the query-specific first number in conjunction with statistical information associated with the execution of the database query.

17. The computing system of claim 11, further comprising a display unit coupled to the processing unit, wherein the program instructions, upon execution by the processing unit, cause the computing system to display the estimated completion time of the database query while the database query is being executed.

18. A computer program product comprising a non-transitory computer-usable medium having computer-readable program code embodied therein, the computer-readable program code adapted to be executed by a computing system to implement a method comprising:
obtaining an execution plan for a database query received by a database associated with the computing system;
based at least in part on the execution plan, identifying each source object to be accessed in the database to execute the database query;
based on each source object, determining:
statistical information associated with the execution of the query,
a query-specific first number of data rows or blocks in the database to be processed to execute the database query, and
a query-specific second number of data rows or blocks in the database already processed during execution of the database query; and
while the database query is being executed, estimating a completion time of the database query based at least in part on:
statistical information associated with the execution of the query,
the query-specific first number of data rows or blocks in the database to be processed to execute the database query,
the query-specific second number of data rows or blocks in the database already processed during execution of the database query,
a time value for time elapsed prior to completion of the execution of the database query to process the query-specific second number of data rows or blocks.

19. The computer program product of claim 18, wherein the method further comprises:
displaying the estimated completion time of the database query while the database query is being executed.

20. The computer program product of claim 18, wherein the method further comprises:
determining that more than one source object is to be accessed;
creating a corresponding parent-child process for at least one source object;
looping each created parent-child process to consolidate progress of a child process into a respective parent process to obtain from the respective parent process a process-specific first number of data rows or blocks in the database pending to be processed for execution of the database query;
for each created parent-child process, computing a process-specific second number of data rows or blocks in the database already processed during execution of the database query by using the process-specific first number in conjunction with statistical information associated with the execution of the database query; and performing at least one of the following:
  adding all process-specific first numbers to obtain the query-specific first number, and
  adding all process-specific second numbers to obtain the query-specific second number.

\* \* \* \* \*